United States Patent
Aoyama et al.

(10) Patent No.: US 7,869,913 B2
(45) Date of Patent: Jan. 11, 2011

(54) VEHICLE-USE ELECTRIC GENERATOR APPARATUS

(75) Inventors: Kiyoshi Aoyama, Okazaki (JP); Hiroshi Tamura, Nagoya (JP); Akira Kato, Anjo (JP)

(73) Assignee: Denso Corporation, Kariya (JP)

( * ) Notice: Subject to any disclaimer, the term of this patent is extended or adjusted under 35 U.S.C. 154(b) by 798 days.

(21) Appl. No.: 11/819,430

(22) Filed: Jun. 27, 2007

(65) Prior Publication Data

US 2008/0097664 A1 Apr. 24, 2008

(30) Foreign Application Priority Data

Jun. 27, 2006 (JP) ............................. 2006-176777

(51) Int. Cl.
*B60K 6/24* (2007.10)
*B60K 6/28* (2007.10)

(52) U.S. Cl. ................. 701/22; 180/65.265; 180/65.28; 903/905; 903/930

(58) Field of Classification Search .................... 701/22; 180/65.265, 65.28; 903/905, 930
See application file for complete search history.

(56) References Cited

U.S. PATENT DOCUMENTS

| | | | |
|---|---|---|---|
| 5,820,172 A * | 10/1998 | Brigham et al. ........... 290/40 C |
| 6,201,310 B1 | 3/2001 | Adachi et al. | |
| 6,201,312 B1 * | 3/2001 | Shioiri et al. ............. 290/40 C |
| 6,269,895 B1 * | 8/2001 | Tanuguchi et al. ....... 180/65.25 |
| 6,335,610 B1 * | 1/2002 | Winstead .................... 320/132 |
| 6,662,096 B2 * | 12/2003 | Komiyama et al. ........... 701/54 |
| 6,701,903 B1 * | 3/2004 | Collins et al. .......... 123/568.14 |
| 6,864,807 B2 * | 3/2005 | Todoriki et al. ............ 340/988 |
| 6,925,369 B2 * | 8/2005 | Obayashi et al. .............. 701/36 |
| 7,013,205 B1 * | 3/2006 | Hafner et al. ................. 701/22 |
| 7,022,391 B2 * | 4/2006 | Kawai et al. ............... 428/36.7 |
| 7,200,476 B2 * | 4/2007 | Cawthorne et al. ............ 701/51 |
| 7,295,902 B2 * | 11/2007 | Chen et al. .................... 701/22 |
| 7,336,002 B2 * | 2/2008 | Kato et al. ................. 307/10.6 |

(Continued)

FOREIGN PATENT DOCUMENTS

DE  10 2004 009 146 A1  9/2004

(Continued)

OTHER PUBLICATIONS

Electropaedia. Capacitors and SuperCapacitors / Battery Life (and Death). http://www.mpoweruk.com/supercaps.htm and http://www.mpoweruk.com/life.htm. Uploaded in 2005. Downloaded on Jul. 30, 2010.*

(Continued)

*Primary Examiner*—Mark Hellner
*Assistant Examiner*—Ari M Diacou
(74) *Attorney, Agent, or Firm*—Oliff & Berridge, PLC

(57) ABSTRACT

A vehicle power supply apparatus has first and second engine-driven electrical generators and first and second storage batteries, the first generator supplying a stable voltage to the first battery and a first set of loads, and the second generator supplying the second battery and a second set of loads, which can tolerate supply voltage variations. Operation of the second generator and charging/discharging of the second battery are controlled to maintain the total engine torque applied to the generators at a level whereby fuel consumption is reduced, while the supply voltage of the variation-tolerant loads is allowed to vary substantially.

15 Claims, 12 Drawing Sheets

U.S. PATENT DOCUMENTS

| | | | |
|---|---|---|---|
| 7,657,438 B2* | 2/2010 | Obayashi et al. | 320/104 |
| 7,689,330 B2* | 3/2010 | Moran | 701/22 |
| 2002/0008496 A1* | 1/2002 | Shamoto et al. | 320/116 |
| 2002/0123836 A1* | 9/2002 | Komiyama et al. | 701/51 |
| 2002/0132144 A1* | 9/2002 | McArthur et al. | 429/13 |
| 2004/0074682 A1* | 4/2004 | Fussey et al. | 180/65.2 |
| 2004/0142190 A1* | 7/2004 | Kawai et al. | 428/461 |
| 2004/0164616 A1* | 8/2004 | Obayashi et al. | 307/18 |
| 2005/0070397 A1* | 3/2005 | Takasu et al. | 475/254 |
| 2005/0228553 A1* | 10/2005 | Tryon | 701/22 |
| 2005/0246076 A1* | 11/2005 | Chen et al. | 701/22 |
| 2005/0274553 A1* | 12/2005 | Salman et al. | 180/65.2 |
| 2006/0116797 A1* | 6/2006 | Moran | 701/22 |
| 2006/0191727 A1* | 8/2006 | Usami et al. | 180/65.2 |
| 2007/0029986 A1* | 2/2007 | Nakamura et al. | 323/318 |
| 2008/0021628 A1* | 1/2008 | Tryon | 701/99 |
| 2008/0059013 A1* | 3/2008 | Liu et al. | 701/22 |
| 2008/0120002 A1* | 5/2008 | Heap | 701/54 |
| 2008/0122228 A1* | 5/2008 | Liu et al. | 290/40 C |
| 2008/0215199 A1* | 9/2008 | Aoyama et al. | 701/22 |
| 2008/0287255 A1* | 11/2008 | Snyder | 477/110 |
| 2009/0157244 A1* | 6/2009 | Kim | 701/22 |
| 2009/0319110 A1* | 12/2009 | Tani et al. | 701/22 |
| 2010/0076636 A1* | 3/2010 | Ichikawa | 701/22 |

FOREIGN PATENT DOCUMENTS

| | | | |
|---|---|---|---|
| JP | U 62-101339 | | 6/1987 |
| JP | A 5-95637 | | 4/1993 |
| JP | A 5-211727 | | 8/1993 |
| JP | A5-336670 | | 12/1993 |
| JP | A 7-46773 | | 2/1995 |
| JP | A 9-84397 | | 3/1997 |
| JP | 11004507 A | * | 1/1999 |
| JP | A 2000-295827 | | 10/2000 |
| JP | A 2001-69683 | | 3/2001 |
| JP | A 2001-245404 | | 9/2001 |
| JP | A 2001-309574 | | 11/2001 |
| JP | 2002135909 A | * | 5/2002 |
| JP | A 2004-260908 | | 9/2004 |
| JP | A 2005-130630 | | 5/2005 |
| JP | 2006063891 A | * | 3/2006 |
| JP | 2006339165 A | * | 12/2006 |
| JP | 2007237792 A | * | 9/2007 |
| JP | 2007269255 A | * | 10/2007 |
| JP | 2007269256 A | * | 10/2007 |
| JP | 2008247317 A | * | 10/2008 |
| JP | 2008249503 A | * | 10/2008 |
| JP | 2008278559 A | * | 11/2008 |

OTHER PUBLICATIONS

German Office Action issued in German Patent Application No. 10 2007 029 352.8-34; mailed Aug. 2, 2010. (with translation).

* cited by examiner

| POWER GENERATION CONTROL MODE | LOW-VOLTAGE GENERATOR SECTION 4A (VOLTAGE CONTROL) | HIGH-VOLTAGE GENERATOR SECTION 4B (POWER CONTROL) | DC-TO-DC CONVERTER 3 42V → 12V |
|---|---|---|---|
| <A> | ○ | ○ | × |
| <A'> | ○ | ○ | × |
| <B> | ○ | × | × |
| <C> | × | × | ○ |

INTERSECTION POINT "c": ENGINE TORQUE AMOUNT
= T0+T12+T42

INTERSECTION POINT "d": ENGINE TORQUE AMOUNT
= T0+T12+T42x

VEHICLE-USE ELECTRIC GENERATOR APPARATUS

CROSS-REFERENCE TO RELATED APPLICATIONS

This application is based on and incorporates herein by reference Japanese Patent Application No. 2006-176777 filed on Jun. 27, 2006.

BACKGROUND OF THE INVENTION

1. Field of Application

The present invention relates to an electric generator apparatus of a vehicle, and in particular to an electrical generator apparatus which applies control for achieving electrical power generation with reduced fuel consumption.

2. Description of Related Art

In recent years, due to the increasing price of fuel for motor vehicles, there is an increased need for operating vehicles with minimized fuel consumption. The assignees of the present invention have previously proposed (in Japanese Patent First Publication No. 2004-260908, referred to in the following as reference document 1), in regard to reducing fuel costs, a method whereby electric power costs are calculated respectively separately for each of a plurality of electric power sources. For each power source, the corresponding electric power cost is calculated as the amount of fuel (e.g., measured in grams) consumed in generating a unit amount (e.g., one kWh) of electrical energy by that electric power source.

With that method, priority is assigned to supplying power that is produced from the electric power source which provides the lowest-cost energy. In the following, such a method of controlling an electrical generator apparatus will be referred to as power cost reduction generation control.

By using such control, when for example an excess of power is produced from an electric generator which has a low electric power cost (i.e., power is being generated in excess of the power required by the electrical loads supplied by that generator) the excess power can be stored in an electrical energy storage device. For the purpose of description in the following, it will be assumed that each electrical energy storage device is a storage battery, although other types of device such as an electric dual-layer capacitor can be used in such applications. Subsequently, when power is being produced from the electric generator at a relatively high generation cost, changeover can be performed to supplying power to the electrical loads by discharging power from the battery, i.e., the battery is utilized as an electric power source.

In that way, by appropriately controlling the electric power sources in accordance with the costs (measured in terms of consumed fuel) of generating electrical power, reduced fuel consumption can be achieved Furthermore, in recent years (as described for example in Japanese Patent First Publication No. 2001-309574, referred to in the following as reference document 2) a dual-voltage type of vehicle-use electrical power supply apparatus has been proposed. This has a high-voltage power supply system having a high-voltage electric generator and high-voltage battery, for supplying power to electrical loads that operate at a high voltage, and a low-voltage power supply system and low-voltage battery, for supplying power to electrical loads requiring a low voltage. A DC-DC converter is connected between the high-voltage power supply system and low-voltage power supply system, and is controlled for transferring power between them. Such a dual-voltage electric generator apparatus can reduce fuel costs, since a high-voltage system can operate more efficiently (i.e., with lower electrical losses) than a low-voltage system.

With the power cost reduction generation control method previously proposed by the assignees of the present invention, considering a single power supply system (made up of an electric generator that supplies power to electrical loads and to a battery), if variation of the supply voltage of the system must be limited to within a narrow range then it is necessary to utilize a high-capacity battery in order to achieve the desired reduction in fuel costs while sufficiently limiting the amount of supply voltage variation. In addition, the battery must be capable of withstanding deterioration caused by a high frequency of charge/discharge cycles. The cost of a suitable type of battery (e.g., a lithium-ion secondary battery), measured as the cost per unit of charge storage capacity, is substantially higher than the conventional type of lead-acid battery used in a vehicle. For these reasons, the cost of such a battery will be high, and it will occupy a large amount of space. Due to such disadvantages, it has been difficult to put the power cost reduction generation control method into practical application.

The above problems will be described more specifically in the following.

The basis of power cost reduction generation control is to attempt to generate electrical power at the lowest possible generation cost, irrespective of the level of power being consumed in the electrical loads. To achieve this, at each point in time, the difference between the amount of electrical power being generated at that time and the amount of power being consumed by the electrical loads is either (when in excess) stored in a battery, or (when in deficit) is supplied to the electrical loads by discharge from the battery.

For example, the average per-unit cost of the electrical energy that is currently held stored in the battery can be compared with the per-unit cost of electrical energy that is currently being produced by the generator, and if the energy is being produced by the generator at lower cost then that stored in the battery, then the level of output power of the generator can be increased, to thereby increase the amount of charge held in the battery. In that way, the average per-unit cost of the energy that is stored in the battery will be lowered. On the other hand, if electrical energy is being produced by the generator at higher per-unit cost then that stored in the battery, then discharging of the battery can be performed, to use the battery as a power source, while the level of output power of the generator is reduced.

The problem with respect to battery size and cost can be readily understood as follows. To achieve an effective reduction of fuel consumption with such a power cost reduction generation control method, if the amount of variation of the supply voltage must be limited to a narrow range, it is necessary for the maximum amount of energy that can be stored in the battery to be substantially greater than for a conventional type of battery used in a motor vehicle. This is due to the fact the output terminal of the electric generator is connected to the battery terminal of the corresponding battery and to the electrical loads, with the loads thus being supplied at a voltage that is substantially equal to the terminal voltage of the battery. However the terminal voltage of a battery varies substantially in accordance with the level of charge in the battery.

Thus, in order to sufficiently limit the amount of variation of the supply voltage of the electrical loads, it is necessary to limit the degree of variation of the level of charge stored in the battery. However as described above, with the power cost reduction generation control method, a battery is used as a power source at certain times, so that it is necessary that a large amount of power can be discharged from the battery.

To achieve this, while limiting the amount of variation of the terminal voltage of the battery (and hence the amount of variation of the supply voltage of the corresponding loads) to a narrow range, it is necessary for the battery to have a large charge storage capacity, and hence to be large in scale. Such a battery will be heavy and will occupy a large amount of space, and will be high in cost.

In addition to that disadvantage, application of power cost reduction generation control will result in a higher frequency of performing charging/recharging cycles for the battery. With a conventional type of lead-acid battery this will result in an excessively shortened operating lifetime. Hence there is the further problem that not only must each battery be large in capacity, but each battery must be implemented as a device (such as a lithium-ion secondary battery) that has a sufficiently long operating life in spite of a high frequency of charging/recharging cycles.

Since such an alternative type of electric charge storage device is substantially more expensive than a conventional lead-acid battery, then if it is also necessary for that device to have large charge storage capacity and so be made large in scale (due to applying power cost reduction generation control while also limiting the variation of the supply voltage to a narrow range as described above), then the cost of the electric charge storage device will become excessive.

These problems are significant obstacles to achieving practical application of power cost reduction generation control.

SUMMARY OF THE INVENTION

It is an objective of the invention to provide a vehicle-use power supply apparatus that is suitable for implementing a power cost reduction generation control method enabling reduced fuel consumption, but which overcomes the problems of requiring electric charge storage devices that are both large in size and high in cost.

To achieve the above objectives, the invention provides a vehicle-use power supply apparatus which is divided into independently controlled power supply systems, i.e.:

(a) a first power supply system which is controlled as for a conventional vehicle electric power supply system, producing a substantially regulated power supply voltage (e.g., at a nominal 14 V) to electrical loads that require a fixed value of supply voltage, and (b) a second power supply system which is subjected to power cost reduction generation control as described above, but supplies power only to those electrical loads which can tolerate substantial variations in their supply voltage.

In that way, large-scale fluctuations can be allowed for the supply voltage in the second power supply system, so that large variations in the level of charge of an electric charge storage device in that system can be permitted. Thus it becomes unnecessary for that device to be have a large charge storage capacity, so that it can be small in size and relatively inexpensive.

More specifically, the characterizing features of a vehicle-use power supply apparatus according to the present invention are preferably that:

(1) the power supply apparatus comprises a regulated voltage power supply system for supplying electrical power to electrical loads requiring a regulated supply voltage, with the regulated voltage power supply system comprising a first electrical energy storage device for supplying electrical power to the voltage-regulated electrical loads and a first electric generator that is driven by the vehicle engine for supplying electrical power to the first electrical energy storage device and to the voltage-regulated electrical loads, and a voltage variation-tolerant power supply system comprising a second electrical energy storage device for supplying electrical power to voltage variation-tolerant electrical loads, and a second electric generator driven by the vehicle engine for supplying electrical power to the second electrical energy storage device and to the voltage variation-tolerant electrical load, and (2) the control apparatus applies control to hold the power supply voltage of the regulated voltage power supply system at a substantially fixed value, while applying the above-described power cost reduction generation control to the variation-tolerant power supply system (i.e., without controlling the latter system to have a stable value of supply voltage).

Thus the first power supply system is controlled to produce a supply voltage that is limited to a narrow range of variation (referred to in the following as a regulated supply voltage), while the second power supply system is subjected to power cost reduction generation control and the system is not configured to limit the range of variation of the supply voltage of the system to within a narrow range. However the loads that are supplied by the second power supply system are selected to be capable of tolerating substantial variations in power supply voltage, so that satisfactory operation can be achieved.

Considered from another aspect, the second electric charge storage device can be used over a wide range of conditions, i.e., from a condition of very low charge to a condition of being fully charged, since the resultant variations in the terminal voltage of that device will not adversely affect the operation of the electrical loads to which it is connected. Hence it becomes possible to utilize an electric charge storage device having a smaller capacity than has been possible in the prior art, and which will therefore be less expensive, will be lighter in weight, and will occupy less space than would be possible in the prior art.

The first and second electric generators may be implemented as a dual-voltage electric generator apparatus, i.e., a single apparatus unit that is driven from the vehicle engine and which operates as two separate electric generators. However it would be equally possible for the first and second electrical generators to be respectively separate units, each driven from the vehicle engine.

Preferably, the second electrical energy storage device is configured to better withstand the effects of repetitive charging and discharging cycles than the first electrical energy storage device, and so have a sufficiently long operating life. This is due to the fact that the power cost reduction generation control involves a higher frequency of charging and discharging operations (for the second electrical energy storage device) than conventional voltage regulation control.

The cost of generated electrical power (referred to herein as the power generation cost) is preferably measured in terms of consumed fuel, i.e., an amount of fuel consumed in generating a unit amount of electrical energy (e.g., grams per kWh). The cost may be defined as that of the total electrical power that is generated, or as that of the power generated by the second generator.

The control apparatus is also preferably configured to include a memory which stores a data map (prepared beforehand), relating respective values of power generation cost to amounts of engine torque required to be applied by the engine to drive the second electric generators. The torque required to drive the first electric generator can be readily calculated based on the level of electrical power which it is generating (i.e., with the power being calculated from the values of output current and voltage being produced by that generator). In addition, the control apparatus preferably operates such that, in applying power cost reduction generation control to the variation-tolerant power supply system, the control apparatus:

(1) establishes a target value of generation cost;

(2) applies the target value to the data map, to obtain a range of values of permissible torque, i.e., values of torque (applied by the engine to drive the first and second generates) that correspond to a range of generation cost values which are below the target value, and (3) controls the second electric generator to produce a level of electrical power whereby the total amount of torque absorbed generating power by the first and second generators is within the permissible range.

That is to say, the torque that must be applied by the engine to drive first and second generators is determined by the total amount of generated power. Since the power produced by the first electric generator cannot be arbitrarily varied, the level of power produced by the second generator is adjusted to set the total amount of torque absorbed by the first and second electrical generators at a value within the permissible torque range.

If that is not possible, and the total torque being absorbed by the first electric generator is approximately equal to the maximum value in the permissible torque range, then operation of the second electric generator is halted.

The control apparatus can include a power converter apparatus (e.g., DC-to-DC converter). In that case, if (with the second electric generator being halted) the total torque absorbed by the first electric generator corresponds to a power generation cost that is higher than the target value, then operation of both the first and second electrical generators is halted, and the supply voltage of the voltage-regulated system is held constant by supplying power that is discharged from the charge storage device of the voltage variation-tolerant system.

Preferably, when operating conditions permit, the control apparatus sets the level of power generated by the second electric generator such that the total amount of torque absorbed by the first and second generators is a value within the permissible range that corresponds to minimum generation cost.

The control apparatus may be configured to calculate the target value of generation cost based upon the amount of charge remaining in the second electric charge storage device.

Alternatively, the target value of generation cost may be calculated as the average cost per unit amount of electrical energy currently held stored in the second electric charge storage device, i.e., the average of the respective generation costs of successive unit amounts of electrical energy that have been stored in the second electric charge storage device.

However preferably the target value of power generation cost is selected to be the larger one of:

(a) a value determined based on the level of charge in the second electric charge storage device and (b) the cost of the electrical energy currently held stored in the second electric charge storage device.

The first electric charge storage device may for example be a lead-acid battery, while the second electric charge storage device may for example be a lithium-ion secondary battery, or an electric dual-layer capacitor.

BRIEF DESCRIPTION OF THE DRAWINGS

FIGS. 10(a), 10(b) show a stored data map corresponding to FIG. 7, but illustrating operation for the case in which a power supply mode A' shown in FIG. 6 is selected, while

DESCRIPTION OF PREFERRED EMBODIMENTS

Figure 1:
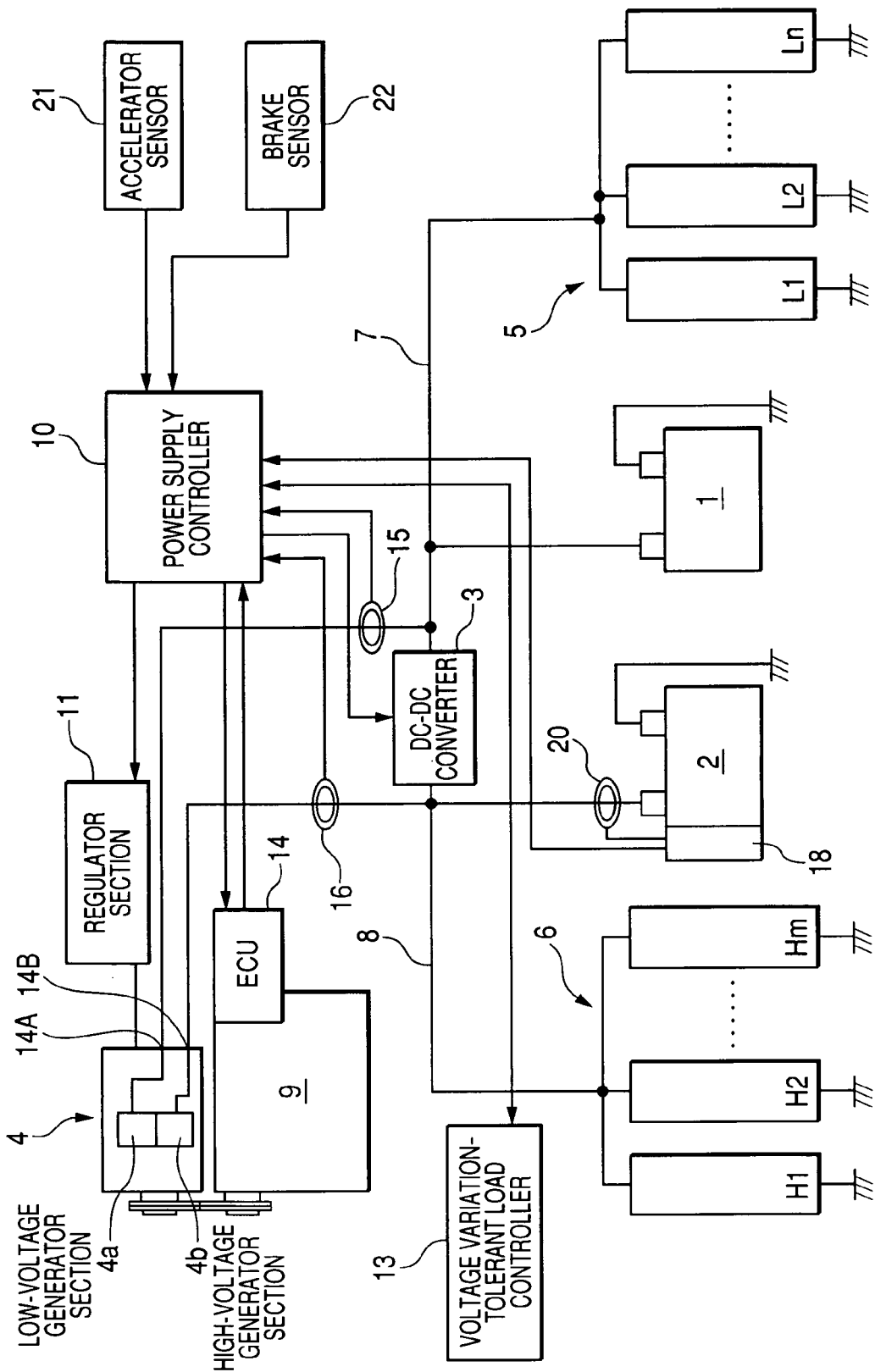
FIG. 1 is a general system block diagram showing the overall configuration of an embodiment of a vehicle-use power supply apparatus.

Preferred embodiments of a vehicle-use power supply apparatus will be described in the following referring to the drawings. However it should be noted that the invention is not limited to these embodiments, and that various modifications or alternative configurations could be envisaged which fall within the scope claimed for the invention, as set out in the appended claims.

FIG. 1 is a general system block diagram of a first embodiment of a vehicle-use power supply apparatus. The power supply system of the embodiment will first be described. As shown in FIG. 1, this includes a low-voltage battery 1 having a rated voltage of 14 V, a high-voltage battery 2 having a rated voltage of 42 V, a DC-to-DC converter 3 for transferring electrical power between the low-voltage battery 1 and high-voltage battery 2, a dual-voltage electric generator 4 which generates electrical power at two different voltages, a regulated-voltage load group 5, a voltage variation-tolerant load group 6, a low-voltage power supply line 7 and a high-voltage power supply line 8. The dual-voltage electric generator 4 is driven by an engine 9.

The combination of the low-voltage battery 1, a low-voltage generator section 4a of the dual-voltage electric generator 4, and the regulated-voltage load group 5 constitute a regulated-voltage power supply system, in which the supply voltage of the system is regulated to maintain a substantially fixed value. The combination of the high-voltage battery 2, a high-voltage generator section 4b of the dual-voltage electric generator 4, and the voltage variation-tolerant load group 6 will be referred to as the voltage variation-tolerant power supply system, in which a substantial amount of variation of the supply voltage of the system is permissible.

The low-voltage battery 1 is a lead-acid battery, with the positive terminal of the battery being connected to the low-voltage power supply line 7 and the negative terminal connected to ground. The low-voltage power supply line 7 transfers power from output terminal 14A of the low-voltage generator section 4a of the dual-voltage electric generator 4 to the regulated-voltage load group 5, which is made up of a number of electrical loads L1 to Ln. At least part of these electrical loads L1 to L1 require a supply voltage that is regulated to only a small range of variation with respect to 14V, so that the electrical loads L1 to Ln will be referred to as the regulated-voltage loads.

The regulated-voltage loads L1~Ln can for example consist of communication equipment, control equipment, a radio transmitting/receiving apparatus, the vehicle headlamps, etc.

The high-voltage battery 2 of this embodiment is a lithium-ion secondary battery, rated at 42 V. Such a battery has a lower rate of deterioration resulting from repetitive charge-discharge cycling, by comparison with a lead-acid battery, and so has a longer operating lifetime when used in a system in which power cost reduction generation control is applied. The positive terminal of the high-voltage battery 2 is connected to the high-voltage power supply line 8 and the negative terminal connected to ground. It should be noted that it is not essential that a lithium secondary cell type of battery be used in this application, and that it would be possible for example to use an electric dual-layer capacitor, or to use such a capacitor connected in parallel with a lithium-ion secondary battery.

The high-voltage power supply line 8 supplies power from the output terminal 14B of the high-voltage generator section 4b of the dual-voltage electric generator 4 to the voltage variation-tolerant load group 6, which consists of one or more electrical loads H1 to Hm, each of which is capable of operating with large-scale variations in its supply voltage, with these being referred to as the voltage variation-tolerant loads. These can consist for example of heaters, air conditioner motors, a motor of an electric power steering system, etc.

The power consumed by a motor or heater will vary in accordance with the power supply voltage. However in the case of for example a defroster heater, or the motors of fans, etc., the variations in power consumed by such loads will not present a problem. In the case of a motor having operating characteristics whereby the power consumption of the motor should be held constant, and which is to be driven by the 42 V supply, the embodiment could be modified to apply inverter control for stabilizing the supply voltage of that specific motor.

The DC-to-DC converter 3 is controlled, when necessary, to transfer electrical power from the voltage variation-tolerant power supply system to the regulated-voltage power supply system as described in the following. It should be noted that use of such a power transfer device is not an essential feature of the invention, and that it would be possible to configure an alternative embodiment in which the DC-to-DC converter 3 is omitted.

The DC-to-DC converters for use as electrical power transfer devices are well known, so that detailed description is omitted.

The control system of the embodiment will be described in the following. The control system is made up of a control section and a group of sensors. The control section includes a power supply controller 10, a regulator section 11, a voltage variation-tolerant load controller 13, and an ECU (engine control unit) 14, each of which is based on a microcomputer that operates in accordance with a control program to execute the functions described in the following, and which are linked to one another via a local data communication network to exchange commands and data. Since systems for communication between electronic equipment units of a motor vehicle are now well known, detailed description is omitted. It should be noted that it would be equally possible to configure an alternative embodiment in which the voltage variation-tolerant load controller 13 is omitted, or in which a single unit performs the combined functions of two or more of the described separate control units.

The sensor group includes a current sensor 15 for detecting the current that flows between the low-voltage generator section 4a of the dual-voltage electric generator 4 and the regulated-voltage system (i.e., flows to the low-voltage power supply line 7, whose nominal voltage level is 14 V), a current sensor 16 which detects the current that flows between the high-voltage generator section 4b and the voltage variation-tolerant system, (i.e., flowing to the high-voltage power supply line 8, whose nominal voltage level is 42 V), a current sensor 20 which detects the charge/discharge current that flows between the high-voltage battery 2 and the high-voltage power supply line 8, and a high-voltage battery monitoring section 18 which monitors the status of the high-voltage battery 2 based on information including the detection results that are obtained by the current sensor 20. The term charge/discharge current is used in this description and in the appended claims with the significance of "charging current or discharge current" of an electric charge storage device. The sensor group also includes an accelerator sensor 21 and a brake sensor 22, and can also include other sensors. Although not specifically shown, the power supply controller 10 also receives a detected value of the output voltage of the low-voltage generator section 4a.

The detection data respectively obtained by the current sensor 15 and current sensor 16 are supplied to the power supply controller 10.

With this embodiment, the high-voltage generator section 4b is a combination of a 3-phase inverter and a 3-phase AC machine which is selectively operated as an electric generator or as a motor, in accordance with control of the 3-phase inverter by the power supply controller 10. The dual-voltage electric generator 4 thereby functions in either in a (normal) generator operation mode or in a motor operating mode in which the high-voltage generator section 4b provides torque assistance to the engine 9 when necessary, with power supplied by discharging the high-voltage battery 2. With the latter mode of operation, the current sensor 16 detects the level of input current that is supplied to the high-voltage generator section 4b. However the invention could be equally applied to a configuration in which the high-voltage generator section 4b utilizes a usual type of diode 3-phase rectifier apparatus, with only electric power generation being performed by the dual-voltage electric generator 4. The low-voltage generator section 4a is a combination of a diode rectifier circuit and an AC generator whose field current is controlled by the power supply controller 10 acting through the regulator section 11, to control the level of generated power of the low-voltage generator section 4a and so control the voltage appearing on the low-voltage power supply line 7.

The high-voltage battery monitoring section 18 uses the charge/discharge current detection information from the current sensor 20 in conjunction with information relating to the temperature, etc, of the high-voltage battery 2, and transmits resultant status data concerning the high-voltage battery 2 to the power supply controller 10. In particular, the high-voltage battery monitoring section 18 derives an estimated value of the state of charge (SOC) of the high-voltage battery 2 based on the level of charge/discharge current etc., of that battery, where the SOC is a percentage of a specific amount of charge (i.e., amount of kWh of electrical energy). However it would be equally possible to utilize an estimated value of the amount of charge remaining in the high-voltage battery 2, in place of a SOC value.

Data expressing the respective degrees of actuation of the vehicle accelerator pedal and brake pedal are supplied from the accelerator sensor 21 and the brake sensor 22 to the power supply controller 10. However it would be equally possible to utilize a throttle sensor to detect the degree of opening of the engine throttle instead of detecting actuation of the accelerator pedal.

Based on the data expressing the respective degrees of actuation of the vehicle accelerator pedal and brake pedal, the power supply controller 10 judges whether it is necessary to apply regenerative braking or to apply torque assistance, and controls the high-voltage generator section 4b to function either in the generator operation mode or in the motor operation mode, in accordance with the judgement results.

In the generator operation mode, based on the data acquired from the sensor group as described above and data that are obtained from the voltage variation-tolerant load controller 13 and the ECU 14, the power supply controller 10 supplies commands to the regulator section 11 designating the respective levels of electrical power to be produced by the low-voltage generator section 4a and high-voltage generator section 4b, and the regulator section 11 controls the respective levels of field current of the AC generators of the low-voltage generator section 4a and high-voltage generator section 4b accordingly.

In addition, the power supply controller 10 sends data to the ECU 14 specifying a value of torque demand, which is the amount of drive torque required to be applied by the engine 9 for driving the dual-voltage electric generator 4. This value of drive torque is calculated as a total amount of torque that will be absorbed by the low-voltage generator section 4a and high-voltage generator section 4b in combination when these are producing respective currently specified levels of electrical power, at the current rotation speed at which the 4× is being driven by the engine 9. In response, the ECU 14 controls the engine 9 to provide the requisite amount of torque for driving the dual-voltage electric generator 4 (i.e., in addition to the torque that is being applied by the engine 9 to drive the vehicle) while maintaining the same engine speed.

If necessary (as described hereinafter), the power supply controller 10 also supplies commands to the DC-to-DC converter 3 specifying an amount of electrical power that is to be transferred between the low-voltage power supply line 7 and high-voltage power supply line 8, and the direction of transfer.

Data are also exchanged between the power supply controller 10 and voltage variation-tolerant load controller 13 concerning the detected statuses of the voltage variation-tolerant loads H1~Hm and the distribution of electrical power to these loads.

If torque assistance is to be applied to the engine 9, then instead of commands specifying the level of generated electrical power of the high-voltage generator section 4b, the power supply controller 10 supplies commands to the regulator section 11 specifying the amount of load constituted by the torque assistance, i.e., the level of drive torque to be produced by the dual-voltage electric generator 4 when operated as a motor, and the regulator section 11 controls the field current of the high-voltage generator section 4b and the operation of the 3-phase inverters to obtain the required level of drive torque.

Hence this embodiment the low-voltage generator section 4a and the high-voltage generator section 4b of the dual-voltage electric generator 4 are controlled respectively independently as separate electrical generators, with the power supply controller 10 producing respectively separate commands designating the level of generator power that is to be supplied by the low-voltage generator section 4a to the regulated-voltage system and commands designating the level of generator power that is to be supplied by the high-voltage generator section 4b to the voltage variation-tolerant system, during operation in the generation mode.

The level of the (nominal 14 V) voltage of the regulated-voltage system is thereby held substantially constant, in the same manner as for a conventional regulated-voltage system of a vehicle. Specifically, the terminal voltage of the low-voltage battery 1 is received by the power supply controller 10, the difference between that terminal voltage and a reference voltage is obtained, and the power supply controller 10 acts via the regulator section 11 to control the field current of the low-voltage generator section 4a to bring the difference towards zero.

Since such a form of control is well known, detailed description is omitted.

Commands for controlling the voltage variation-tolerant system to implement power cost reduction generation control are described in detail hereinafter.

The voltage variation-tolerant load controller 13 operates to adjust the levels of electrical power consumed by the voltage variation-tolerant loads H1~Hm. It should be noted that each of the voltage variation-tolerant loads H1~Hm may consist of a plurality of electrical loads. With this embodiment, the voltage variation-tolerant load controller 13 is a circuit which controls the supplying of electrical power to each of the voltage variation-tolerant loads H1~Hm individually. However it would be equally possible for the voltage variation-tolerant load controller 13 to be configured only to detect the respective levels of electrical power consumed by the voltage variation-tolerant loads H1~Hm. Whichever method is utilized, it is necessary that the power supply controller 10 can acquire (from the voltage variation-tolerant load controller 13) the value of electrical power being consumed by the voltage variation-tolerant loads H1~Hm.

If a method were to be used whereby the voltage variation-tolerant load controller 13 simply detects the total amount of power being consumed by the voltage variation-tolerant loads H1~Hm, and supplies the detection information to the power supply controller 10, then the power supply controller 10 can control the high-voltage generator section 4b based on the difference between the total amount of current being drawn by the voltage variation-tolerant loads H1~Hm and the charge/discharge current of the high-voltage battery 2 as detected by the current sensor 20. However with such a method, the DC-to-DC converter 3 would not be utilized.

The method used with this embodiment, whereby the voltage variation-tolerant load controller 13 controls the levels of power supplied to the voltage variation-tolerant loads H1~Hm respectively separately, will be referred to as distributed power control. Adjustment of the power consumed by an electrical load can be performed either by simply switching the supply of power on or off, or a continuously variable type of switching control can be used. Furthermore it would be equally possible to implement the distributed power control with respective levels of priority being assigned to the voltage variation-tolerant loads H1~Hm, in a fixed order of priority.

It would also be possible to implement an alternative embodiment in which the voltage variation-tolerant load controller 13 is eliminated, so that centralized control of the power supplied to the voltage variation-tolerant loads H1~Hm is not performed.

With this embodiment the power supply controller 10 transmits a target value of electrical power cost to the ECU 14, which then calculates a range of permissible values of torque that can be applied to the dual-voltage electric generator 4. This permissible torque range corresponds to a range of permissible values of electrical power generation cost that do not exceed the aforementioned target value of electrical power cost. The ECU 14 derives the permissible torque range by applying the target value of electrical power cost to a stored data map that has been prepared beforehand and which relates values of engine fuel cost to corresponding values of torque applied by the engine to drive the dual-voltage electric generator 4, as described in detail hereinafter.

The power supply controller 10 then calculates a demand value of drive torque to be applied by the engine 9 to the dual-voltage electric generator 4, and transmits that value to the ECU 14. In response, the ECU 14 controls various factors such as the engine fuel injection amounts, etc., to control the engine 9 to apply the demand value of torque (i.e., in addition to the torque applied for driving the vehicle) while maintaining the engine speed (and hence the rotation speed of the dual-voltage electric generator 4) unchanged.

It should be noted that since there is a fixed ratio between the engine speed and the rotation speed of the dual-voltage electric generator 4, it is possible to use either of these in calculations relating to the rotation speed of the dual-voltage electric generator 4.

The power supply controller 10 also sends commands to the regulator section 11, designating respective levels of electrical power that are to be produced by the low-voltage generator section 4a and the high-voltage generator section 4b.

The total level of generated electrical power corresponds to a specific amount of torque which will be absorbed by the dual-voltage electric generator 4. The total generated power (i.e., from the low-voltage generator section 4a and high-voltage generator section 4b in combination) determines the amount of torque absorbed by the dual-voltage electric generator 4, and so determines the aforementioned demand value of torque.

The regulator section 11 then controls the low-voltage generator section 4a and high-voltage generator section 4b to produce the required total level of generated power.

The low-voltage generator section 4a is controlled to maintain a substantially constant output voltage as described above, in the same way as for a conventional vehicle power supply. Hence if DC power transfer operation is not being performed by the DC-to-DC converter 3, then (since the required electrical power is the sum of the respective levels of generated power from the low-voltage generator section 4a and the high-voltage generator section 4b) the value of electrical power to be generated by the high-voltage generator section 4b is obtained by subtracting the value of power being generated by the low-voltage generator section 4a from the required total value of electrical power.

Alternatively, the power to be generated by the high-voltage generator section 4b can be set as the sum of the total amount of power being consumed by the voltage variation-tolerant loads H1~Hm and the charge/discharge power of the high-voltage battery 2 (i.e., with charging power being added to the total, and discharge power being subtracted from the total).

Electrical power cost is preferably measured as a number of grams of fuel consumed to produce 1 kWh of electrical energy.

Determination of the level of power to be generated by the high-voltage generator section 4b is described in greater detail hereinafter.

With this embodiment, the power supply controller 10 controls the DC-to-DC converter 3 to appropriately distribute electrical power between the regulated-voltage system and the voltage variation-tolerant system. However it should be noted that all of the control functions described for the power supply controller 10 and voltage variation-tolerant load controller 13 need not necessarily be allocated to these individual controllers, and that some functions could be executed by other controllers. Alternatively, it would be possible implement all of the described control functions by a single controller. For simplicity of description in the following, it will be assumed that the controllers are unified in that way, when describing the power cost reduction generation control that is applied to the voltage variation-tolerant system.

Figure 2:
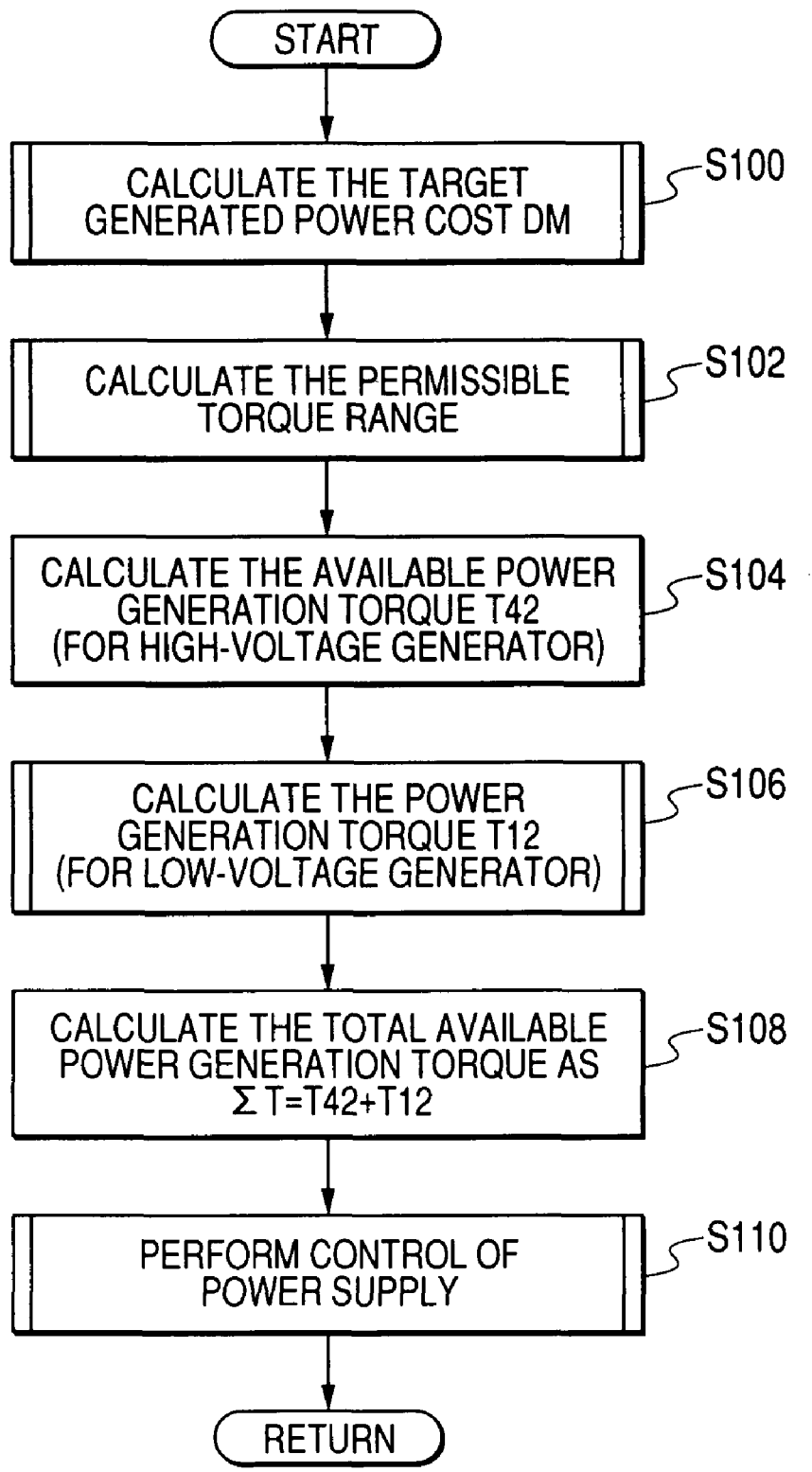
FIG. 2 is a flow diagram for describing a control processing sequence that is executed by the embodiment in controlling generating of electric power.

Power cost reduction generation control operation will be described referring to the flow diagram of FIG. 2. For simplicity of description, this will be assumed to represents a control routine that would be repetitively executed by a single unified controller as described above. However with the apparatus configuration shown in FIG. 1, the control processing that is executed mainly by the power supply controller 10 and ECU 14 in combination, with data being exchanged between them as necessary. This description is given only by way of example, and various other arrangements for implementing the described control processing could be envisaged.

Firstly a designating the cost (g/kWh) of power currently being generated by the high-voltage generator section 4b as the power generation cost D, a target value of D is derived, designated as the target power generation cost DM (step S100). The contents of step S100 are shown in the flow diagram of FIG. 13. With this embodiment, control is applied whereby the actual cost of power generated by the high-voltage generator section 4b is held below the target value DM, or if that is not possible, power generation by the high-voltage generator section 4b is halted and power is discharged from the high-voltage battery 2. DM is selected as the higher one of a No. 1 target value of power cost DM1 and a No. 2 target value DM2, where DM2 is set as the generation cost (g/kWh) of the electrical energy currently held stored in the high-voltage battery 2.

Figure 3:
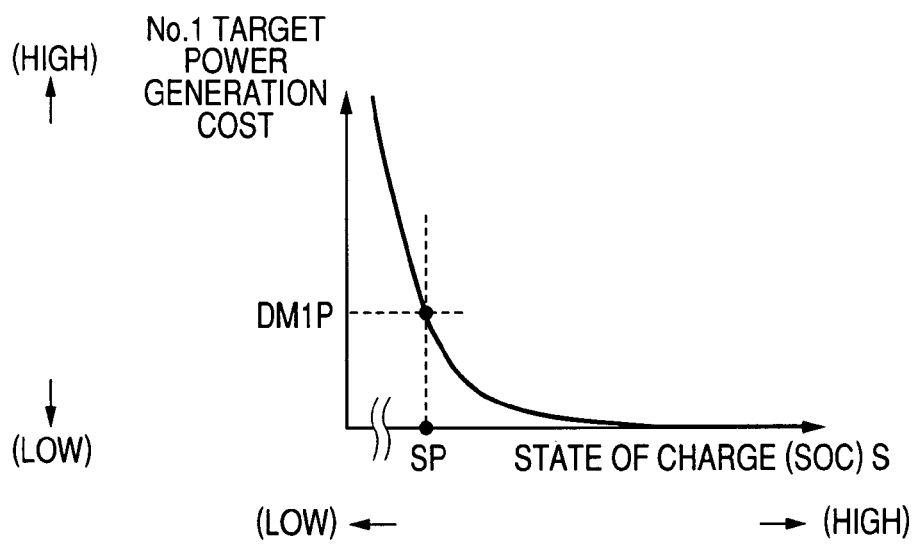
FIG. 3 illustrates the contents of a stored data map that relates a No. 1 target value of power cost to values of state of charge of a high-voltage battery of the embodiment.

Designating the No. 1 target power generation cost DM1 at the current point in time as DM1$p$, DM1$p$ is calculated by applying the SOC value of the high-voltage battery 2 to a data map whose contents are illustrated in FIG. 3. This is a map that has been prepared and stored in memory beforehand, and which relates respective values of DM1 to corresponding values S of the SOC of the high-voltage battery 2. As shown, as the level of charge S in the high-voltage battery 2 increases, the value of DM1 decreases accordingly. It can thus be understood that at any specific value of the SOC, the corresponding value of DM1 constitutes an upper limit to the cost of generated electrical energy that is stored in the high-voltage battery 2, i.e., if that stored energy cost comes to exceed DM1, then it is set as the target power generation cost DM.

Thus considering a specific value of the SOC of the high-voltage battery 2, such as the value SP shown in FIG. 3, if the corresponding cost value (DM1P) is higher than the cost of the energy currently held stored in the high-voltage battery 2, then DM1P will be set as the target power generation cost DM. If the level of charge in the high-voltage battery 2 thereafter increases, the obtained value of DM1 will decrease until the cost of the energy stored in the high-voltage battery 2 becomes selected as the target power generation cost DM, i.e., the value set for DM will be reduced. When DM becomes sufficiently low, then as described hereinafter, power generation by the high-voltage generator section 4b (or by both that section and the low-voltage generator section 4a) is halted, and discharging of power from the high-voltage battery 2 is commenced.

As a result, if the SOC of the high-voltage battery 2 is insufficient then charging of the high-voltage battery 2 is performed by the high-voltage generator section 4b, while when the level of charge exceeds than a certain extent, power is discharged from the high-voltage battery 2.

The aforementioned stored power cost will be designated as Ds, i.e., the average generation cost (g/kWh) of the electrical energy that is currently held in the high-voltage battery 2. During charging of the high-voltage battery 2, each time a specific unit amount of charge (e.g., 1 kWh) is stored, the generation cost of that unit amount of charge is written into a memory of the power supply controller 10 (not shown in the drawings). The stored power cost Ds is calculated as the average of the respective costs of these stored unit amounts of charge.

Designating the amount of residual charge in the high-voltage battery 2 as p, each time a unit amount of charge is discharged from the high-voltage battery 2, the stored power cost Ds remains unchanged, with only the total amount of stored charge p being decreased by the unit amount. However each time the high-voltage battery 2 is newly charged by a unit amount of charge PU, whose generation cost will be designated as D1, an updated value is obtained for the stored power cost Ds. Designating that updated value as Ds', it is calculated as:

$$Ds'=((Ds \times p)+(D1 \times PU))/(p+PU)$$

The updated value Ds' is then written into memory, as the No. 2 target value of power cost DM2.

Figure 13:
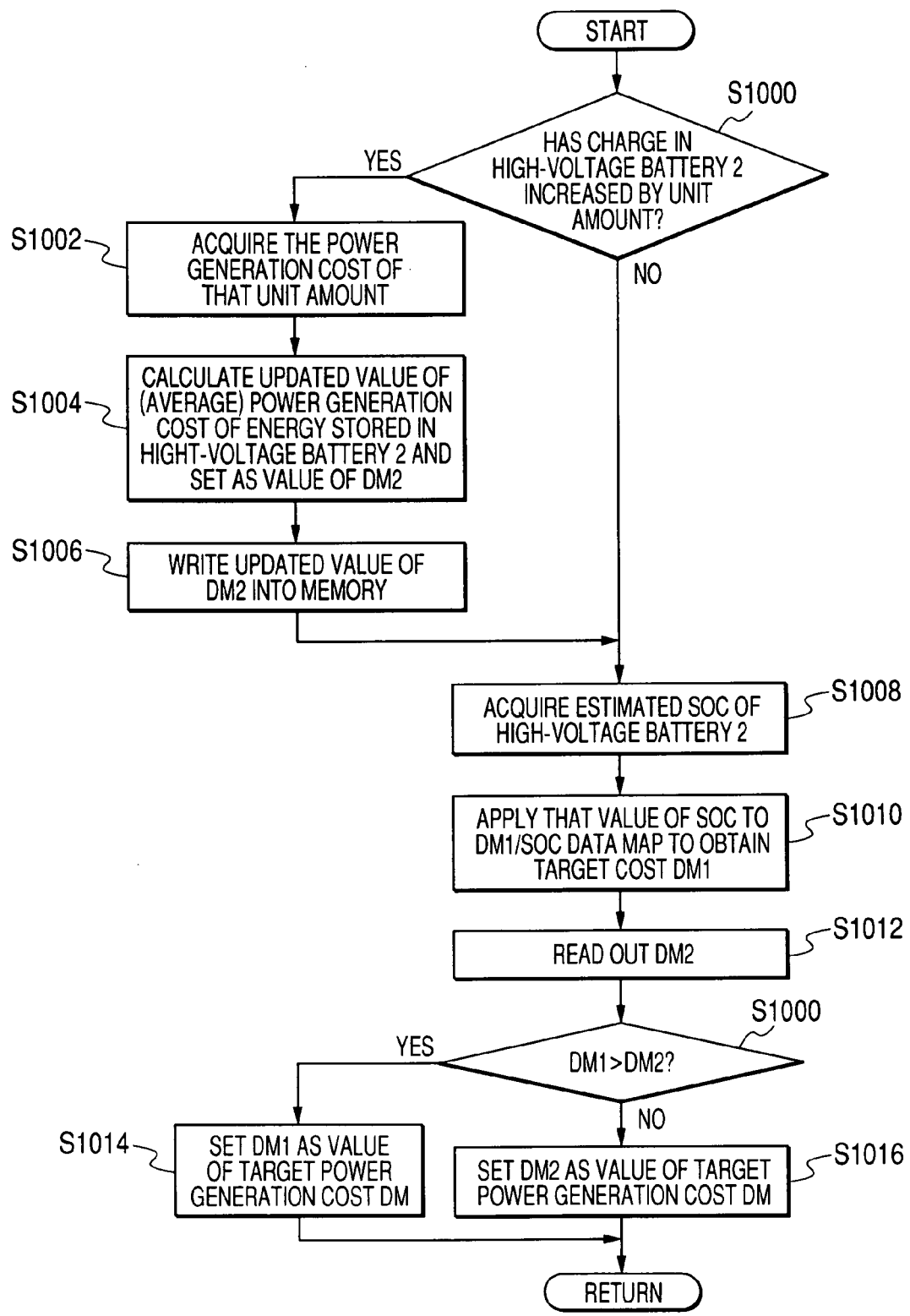
FIGS. 13, 14 15 and 16 are respective flow diagrams for describing the contents of control processing steps in the flow diagram of FIG. 2.

The above operations for deriving the are shown in the sequence of steps S1000, S1002, S1004, S1008 in FIG. 13, while the operations for deriving DM1 are shown in steps S1000, S1008, S1010.

Figure 14:
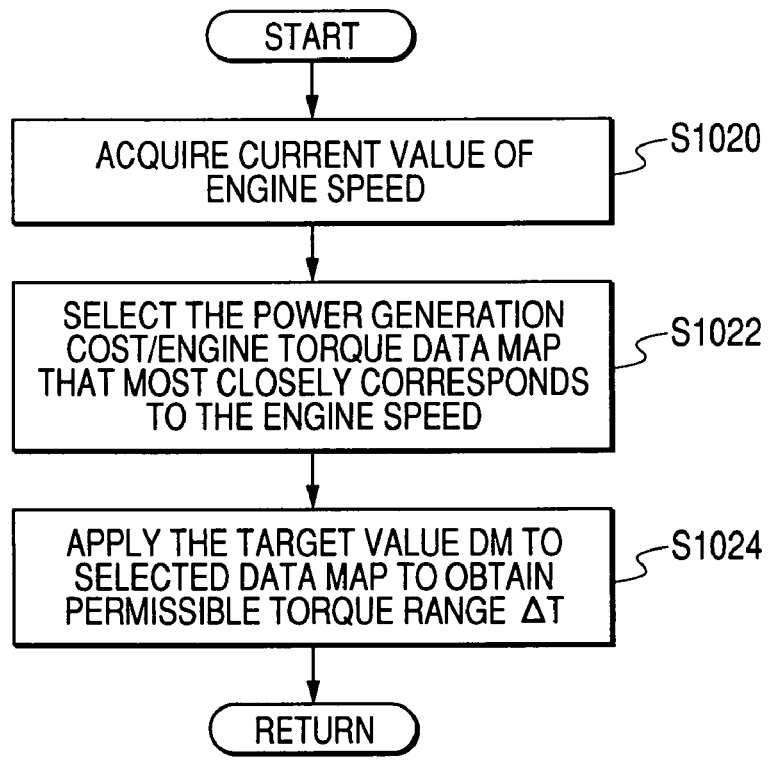

After the target power generation cost DM has been selected as the higher one of DM1 and DM2 as described above, the permissible torque range ΔT is then derived (step S102) by applying DM to a data map (whose contents are illustrated by a graph in FIG. 4) which has been prepared beforehand and stored in memory, and which relates values of engine torque T to corresponding values of power generation cost D, i.e., with the power generation cost D being a function of the engine torque T, where T is the amount of torque that is being applied by the engine 9 to drive the dual-voltage electric generator 4. The contents of step S102 are shown in the flow diagram of FIG. 14.

Figure 4:
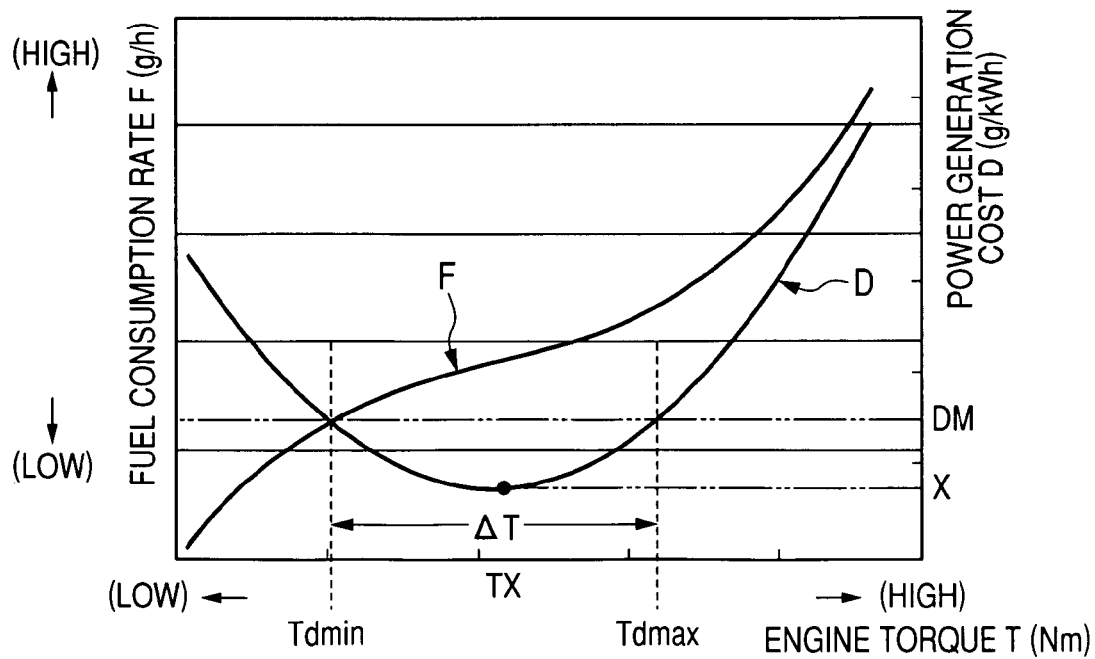
FIG. 4 illustrates the contents of a stored data map that relates values of engine torque applied for electrical power generation to corresponding values of generated electrical energy cost.

FIG. 4 also shows the relationship between values of fuel consumption F and engine torque T.

The power generation cost D is also a function of engine speed. With this embodiment, a plurality of data maps each of the form shown in FIG. 4 are stored beforehand in memory, respectively corresponding to different values of engine speed. The map that corresponds most closely to the current speed of rotation of the engine 9 is selected (S1022) for use in deriving the permissible torque range ΔT as described above.

However for a simpler configuration, it would be possible to use only a single map, corresponding to a representative engine speed.

The permissible torque range ΔT is a range of values of the engine torque T for which the generated power cost D is lower than the target power generation cost DM, and which extends from a minimum value Tdmin to a maximum value Tdmax, as shown in FIG. 4.

Figure 15:
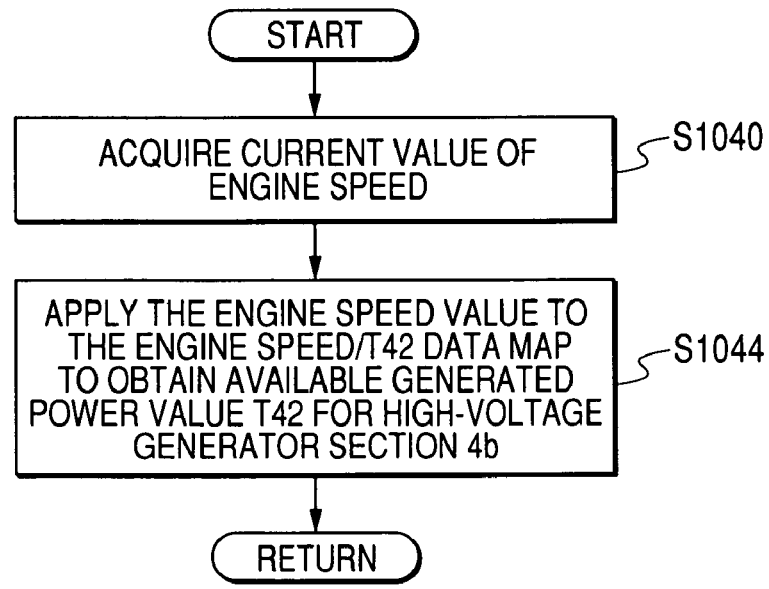

Next, a value of available power generation torque T42 for the high-voltage generator section 4b of the dual-voltage electric generator 4 is derived (step S104). The contents of step S104 are shown in the flow diagram of FIG. 15. T42 is an amount of torque, absorbed by the high-voltage generator section 4b, which corresponds to a maximum level of power that that can be produced by the high-voltage generator section 4b at the current engine speed (i.e., speed at which the dual-voltage electric generator 4 is currently being driven).

The value of T42 is obtained by applying the current speed of rotation of the engine 9 to a data map that has been prepared and stored in memory beforehand, and which relates predetermined values of the available power generation torque T42 to corresponding values of engine speed (S1044). Alternatively, generator rotation speed could be utilized in place of engine speed, for such a map.

Figure 16:
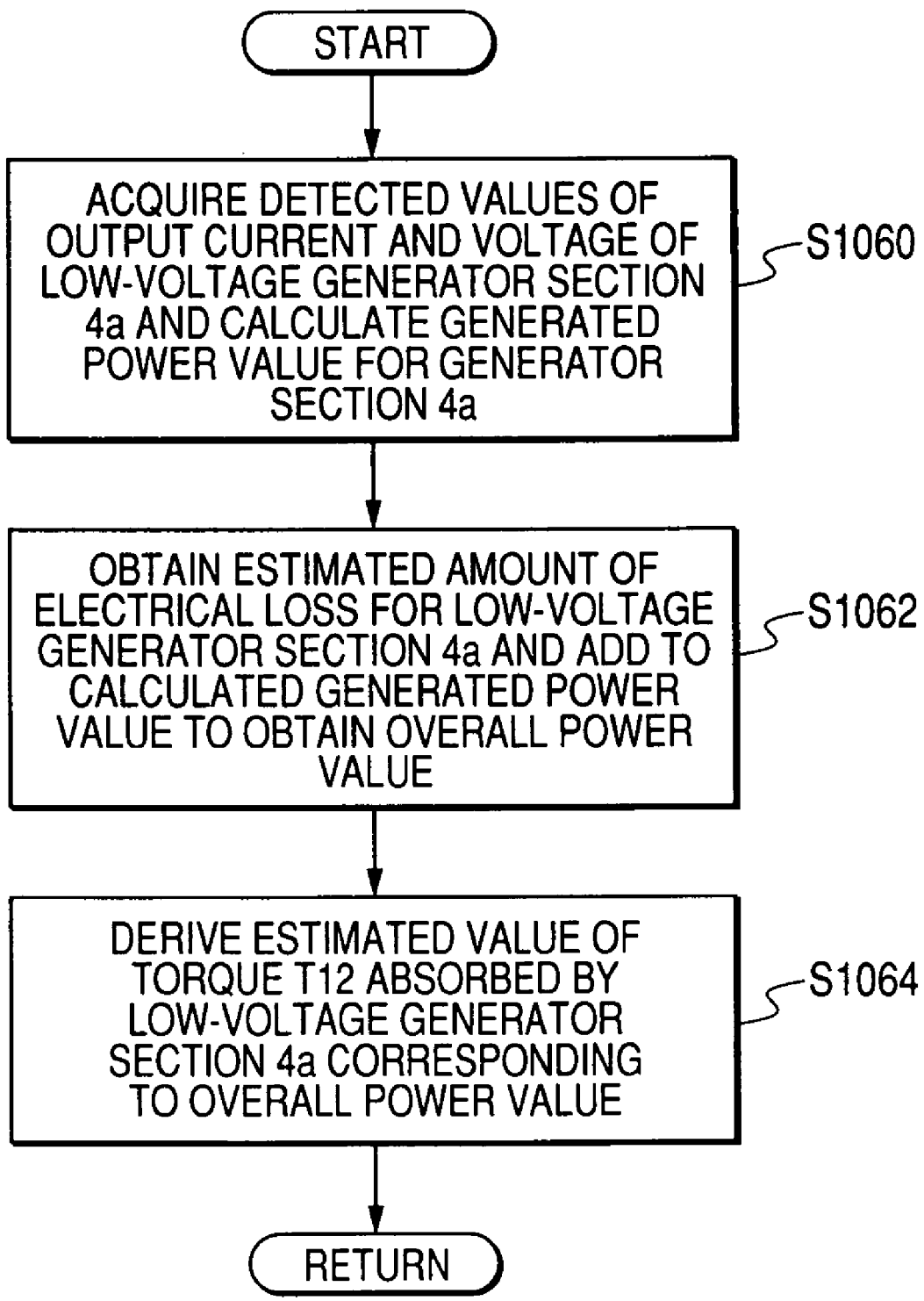

The amount of torque T12 that is being absorbed in generating power by the low-voltage generator section 4a is then calculated (step S106). The contents of step S106 are shown in the flow diagram of FIG. 16. The value of T12 can readily be calculated based on an overall value of electrical power that is obtained by adding the output power being generated by the low-voltage generator section 4a to a predetermined value of estimated electrical losses for the low-voltage generator section 4a (S1062). The output power generated by the low-voltage generator section 4a is calculated based on the level of generator current detected by the current sensor 15 and the voltage supplied to the low-voltage power supply line 7 (S1060). The amount of torque being absorbed by the low-voltage generator section 4a is then calculated based on the level of mechanical power (torque×generator rotation speed) corresponding to the obtained overall value of electrical power for the low-voltage generator section 4a (S1064).

If the DC-to-DC converter 3 is in operation then the effect of this can be considered as a change in value of one of the unregulated-voltage loads H1~Hm.

Next (step S108 of FIG. 2), the sum of the available power generation torque T42 and the power generation torque T12 is calculated, as the total available power generation torque ΣT. This is the maximum amount of torque that will be absorbed by the dual-voltage electric generator 4 in generating power under the current operating conditions (i.e., at the current speed of the engine, with both of the low-voltage generator section 4a and high-voltage generator section 4b in operation), in addition to a zero-power torque T0. The zero-power torque T0 is an amount of torque that is absorbed by the dual-voltage electric generator 4 when the level of generated electrical power of each of the generator sections 4a, 4b is zero.

The actual amount of torque absorbed by the high-voltage generator section 4b is designated as T42x, which is set to a value that is equal to or less than the available power generation torque T42, as described in the following.

Figures 6, 7:
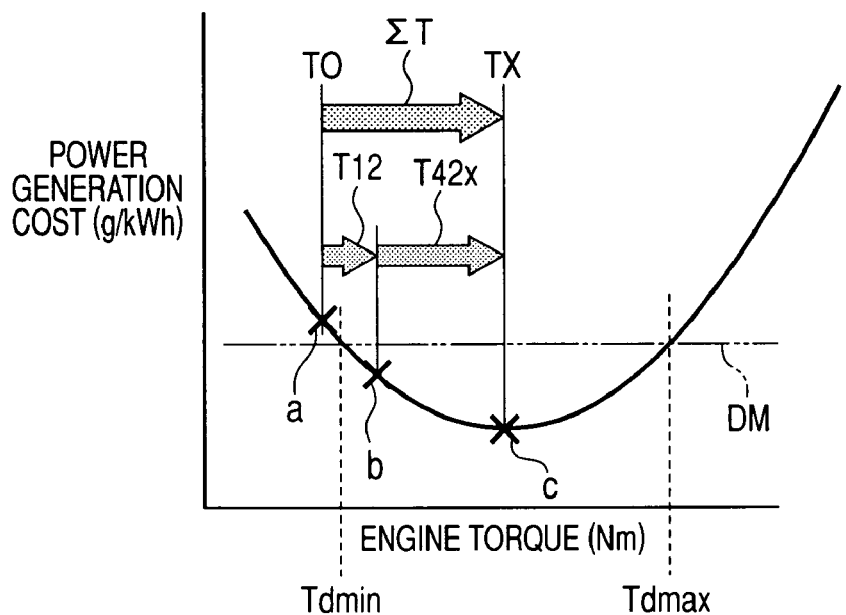
FIG. 6 is a table for use in describing respective modes of power supply control that are determined by the control processing shown in FIG. 5.
FIG. 7 illustrates the contents of a stored data map that relates values of electrical energy cost to values of engine torque applied to generate electrical power, and illustrates electrical power control being performed to achieve a minimum power cost.

FIG. 7 shows an example of the contents of the power cost/engine speed data map of FIG. 4, in conjunction with examples of the zero-power torque value T0, total available power generation torque ΣT, power generation torque T42x of the high-voltage generator section 4b, and power generation torque T12 of the low-voltage generator section 4a

Control of power generation by the dual-voltage electric generator 4 and (if necessary) transferring of electrical power by the DC-to-DC converter 3 is then performed (step S110). The contents of the control processing of step S110 are shown in the flow diagram of FIG. 5.

Firstly, a decision is made as to whether the minimum power cost value X (described above referring to FIG. 4) is lower than the target power generation cost DM (step S1100). If there is a NO decision, then step S1102 is executed, in which generating of power by the low-voltage generator section 4a and the high-voltage generator section 4b (at the relatively high power generation cost D) is halted, to thereby lower the fuel consumption.

In this condition, the low-voltage battery 1 discharges power via the low-voltage power supply line 7 to the regulated-voltage loads L1~Ln, while the high-voltage battery 2 discharges power via the high-voltage power supply line 8 to the voltage variation-tolerant loads H1~Hm. The power supply controller 10 controls the voltage appearing on the low-voltage power supply line 7 close to the requisite fixed value, by transferring power from the high-voltage power supply line 8 via the DC-to-DC converter 3 to the low-voltage power supply line 7.

This transferring of power that is discharged from the high-voltage battery 2 (in addition to the discharge power that is supplied from the high-voltage battery 2 to the unregulated-voltage loads H1~Hm) results in a lowering of the terminal voltage of the high-voltage battery 2, and a consequent lowering of the supply voltage applied to the voltage variation-tolerant loads H1~Hm from the high-voltage power supply line 8. However the maximum extent of this lowering of that supply voltage is predetermined as not to be sufficient to affect the operation of the loads H1~Hm.

As this control by the power supply controller 10 continues to be applied, with power continuing to be discharged from the high-voltage battery 2 so that the SOC of the high-voltage battery 2 becomes successively lower, then as shown in FIG. 3, the No. 1 target power generation cost DM1 will correspondingly successively increase. When DM1 exceeds the minimum electric power generation cost X (and also exceeds the cost of the energy stored in the high-voltage battery 2, as described above, and so is set as the target power generation cost DM), then at the next execution of the processing of FIG. 5, a YES decision will be reached in step S1100, so that operation then proceeds to step S1104.

In step S1104, a decision is made as to whether the sum of the zero-power torque value T0 and the total available power generation torque, i.e., (T0+ΣT), is within the permissible torque range ΔT. Methods of calculating the zero-power torque of an electric generator are well known, so that detailed description is omitted.

In FIG. 7, and in FIGS. 8, 9, 10 and 11 described hereinafter:

(1) the intersection point "a" indicates a condition in which no electrical power is being generated by the dual-voltage electric generator 4, so that only the zero-power torque value T0 is being applied to the dual-voltage electric generator 4 by the engine 9;

(2) the intersection point "b" indicates a condition in which only the low-voltage generator section 4a is generating power, so that a first total amount of engine torque (T0+T12) is required to be applied to the dual-voltage electric generator 4;

(3) the intersection point "c" corresponds to a second total amount of torque (T0+T12+T42) being applied to the dual-voltage electric generator 4, i.e., with both of the low-voltage generator section 4a and high-voltage generator section 4b generating power, while the intersection point "d" corresponds to a total amount of engine torque (T0+T12+T42x) being required to drive the dual-voltage electric generator 4, where T42x is less than T42. The manner of calculating T42x in that case is described hereinafter.

If the second total amount of torque (T0+ΣT) is judged to be within the permissible torque range (a YES decision in step S1104), then normal regulated-voltage generation control is applied to the low-voltage generator section 4a, and the high-voltage generator section 4b is controlled to generate a level of electrical power corresponding to the available power generation torque T42 value that was derived in step S104 as described above (step S1106), i.e., the value of T42x is set equal to T42.

The field current of the high-voltage generator section 4b is then adjusted to generate the specified level of power, whereby the torque absorbed by the high-voltage generator section 4b in producing electrical power (i.e., an amount that is in addition to the proportion of the zero-power torque T0 which is absorbed by the high-voltage generator section 4b) will be equal to the available power generation torque T42.

Diagrams 9(*a*) and 9(*b*) show two examples of operating conditions whereby the control processing of step S1106 will be executed. This control processing will be referred to as mode A, which is one of four possible modes shown in the table of FIG. 6. In FIG. 6, the circle symbol indicates that a generator section is in operation, while an "x" symbol indicates that the generator section is not in operation.

In this condition (mode A), the operation of the DC-to-DC converter 3 remains halted. As a result of the high-voltage generator section 4b generating a level of electrical power corresponding to the available power generation torque T42, an excess of power is thereby generated by the high-voltage generator section 4b, and this excess amount is supplied to charge the high-voltage battery 2.

If it is found in step S1104 that the second total amount of torque (T0+ΣT) is not within the permissible torque range, then operation proceeds to step S1108, to judge whether (T0+ΣT) is greater than the maximum permissible torque value Tdmax while also the first total amount of torque (T0+T12) is less than Tdmax. If there is a YES decision in step S1108, step S1110 is executed, in which {(Tdmax−(T0+T12)} is set as the value of power generation torque T42x for the high-voltage generator section 4b, and the power supply controller 10 controls the field current of the high-voltage generator section 4b (acting through the regulator section 11) to generate a level of power from the high-voltage generator section 4b corresponding to that value of torque T42x. The control processing of step S1110 is designated as mode A' in FIG. 6.

Figure 10A:
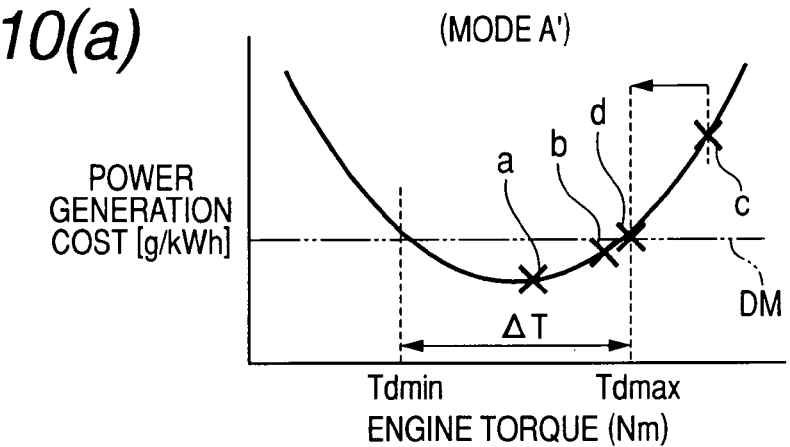
Figure 10B:
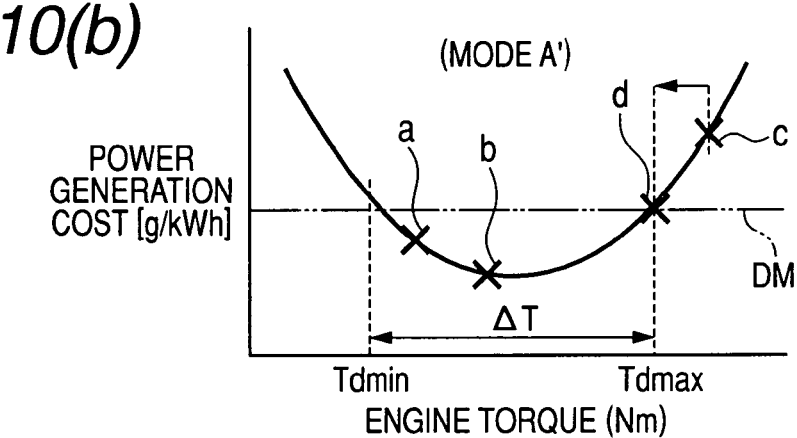

FIGS. 10(*a*) and 10(*b*) show two different examples of engine operating conditions in which the mode A' control processing will be executed.

In this condition, normal regulated-voltage generation control continues to be applied to the low-voltage generator section 4a, while operation of the DC-to-DC converter 3 remains halted. As a result, irrespective of the conditions of the voltage variation-tolerant loads H1~Hm, the generated power cost D for the high-voltage generator section 4b will attain the target power generation cost DM, and so is within a range whereby power is generated with low fuel consumption.

If it is found in step S1108 that:

(a) the second total amount of torque (T0+ΣT) is not greater than the maximum permissible torque value Tdmax, or (b) the first total amount of torque (T0+T12) is not less than Tdmax, then operation proceeds to step S1112.

Figure 8:
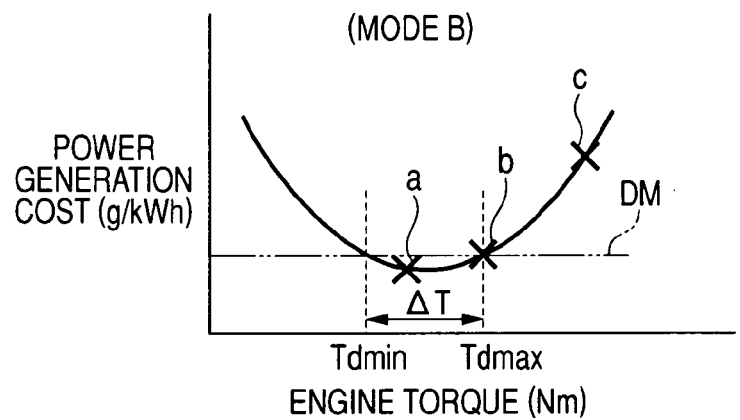
FIG. 8 shows a stored data map corresponding to FIG. 7, but illustrating operation for the case in which a power supply mode B shown in FIG. 6 is selected.
Figure 9A:
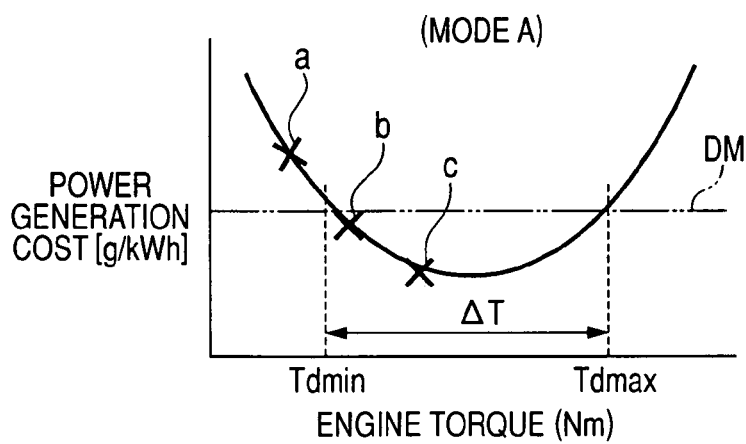
FIGS. 9(a), 9(b) show a stored data map corresponding to FIG. 7, but illustrating operation for the case in which a power supply mode A shown in FIG. 6 is selected.
Figure 9B:
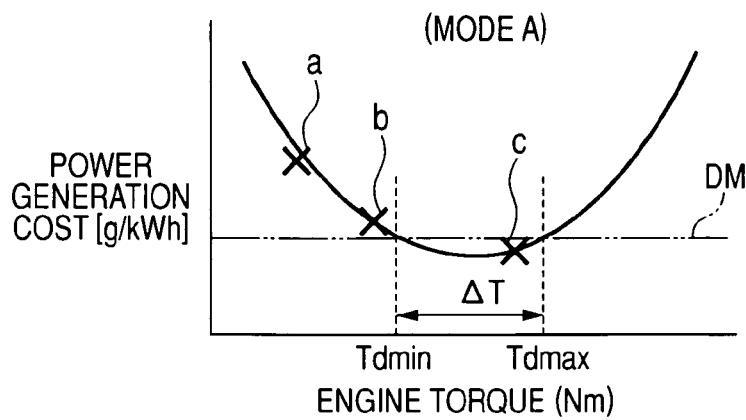

In step S1112, a decision is made as to whether (T0+T12) is approximately equal to the maximum permissible torque value Tdmax. If so, then power generation by the high-voltage generator section 4b is halted, while the low-voltage generator section 4a remains operating under normal regulated-voltage control, and operation of the DC-to-DC converter 3 remains halted (step S1114). This control processing is designated as mode B. An example of an operating condition in which mode B would be established is shown in FIG. 8.

If it is found in step S1112 that the sum of the zero-power torque value T0 and the power generation torque T12 is not approximately equal to the maximum permissible torque value Tdmax, then operation proceeds to step S1102. The control processing of step S1102 (described above, as the processing executed following a NO decision in step S1100) is designated as mode C.

Figure 11A:
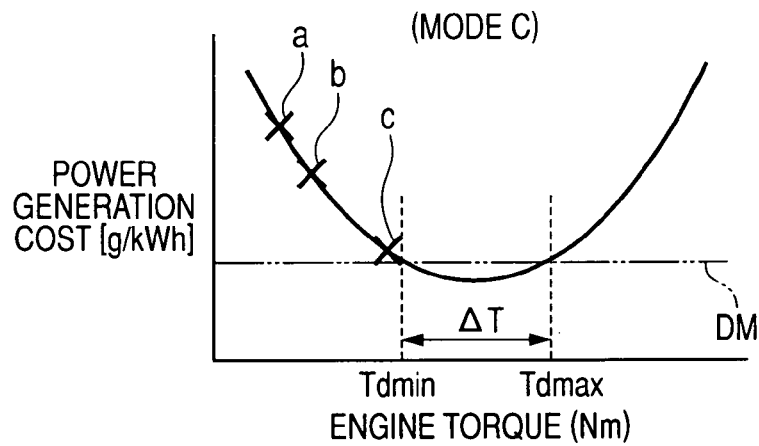
FIGS. 11(a), 11(b), 11(c) show a stored data map corresponding to FIG. 7, but illustrating operation for the case in which a power supply mode C shown in FIG. 6 is selected.
Figure 11B:
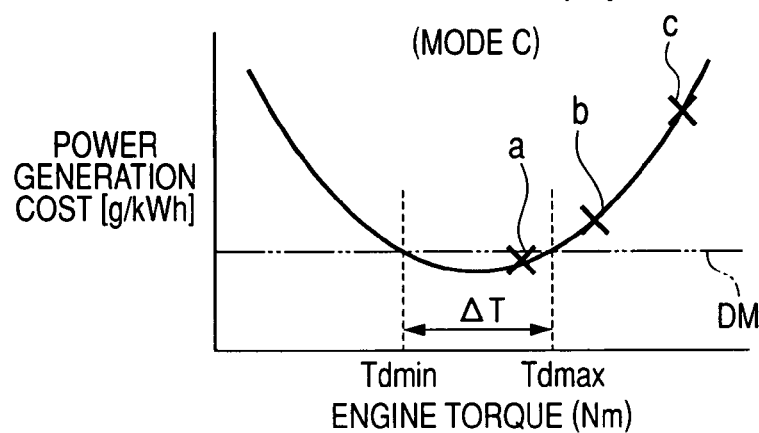
Figure 11C:
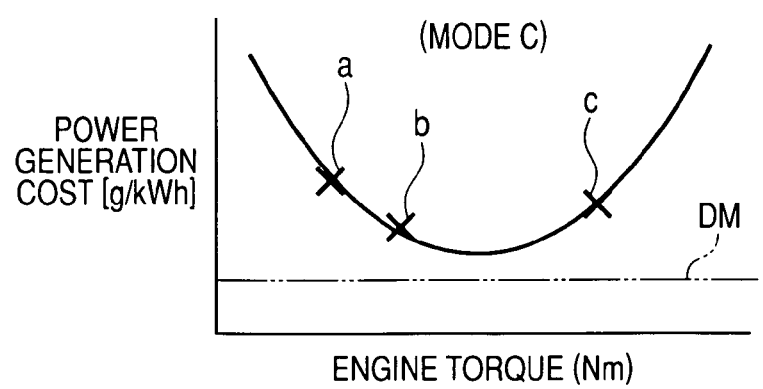

FIGS. 11(a), 11(b) and 11(c) show different examples of operating conditions whereby the mode C control processing of step S1102 will be executed. As shown, each of these is a condition in which the minimum achievable value of power generation cost D is higher than the target power generation cost DM. In that case, power generation by each of the low-voltage generator section 4a and high-voltage generator section 4b is halted and power is discharged from the high-voltage battery 2, while power is transferred from the high-voltage power supply system to the low-voltage system via the DC-to-DC converter 3 as described above.

After the power supply controller 10 sends control commands to the regulator section 11 and the DC-to-DC converter 3 in step S1102, S1114, S1110 or S1106 for controlling the levels of power generated by the low-voltage generator section 4a and high-voltage generator section 4b, step S1116 is executed, in which a demand torque value is then sent to the ECU 14 (i.e., specifying the amount of torque which is currently required to be applied by the engine to drive the generator unit 4, whereby the engine speed will remain unchanged). As can be understood from the above, the demand torque value will be either T0, (T0+T12), (T0+T12+T42), or (T0+T12+T42x), where T42x is less than T42 as described above.

The ECU 14 responds by controlling the engine 9 to produce a level of drive power whereby the demand value of torque is applied to the dual-voltage electric generator 4, with the engine speed left unchanged.

Although the embodiment has been described for the case in which control is performed by the power supply controller 10 in conjunction with the ECU 14, it would be equally possible for the power supply controller 10 to be configured to execute substantially all of the described processing relating to deriving the demand value of torque, i.e., with the permissible torque range ΔT being derived by the power supply controller 10.

Modified Embodiment

Figure 12:
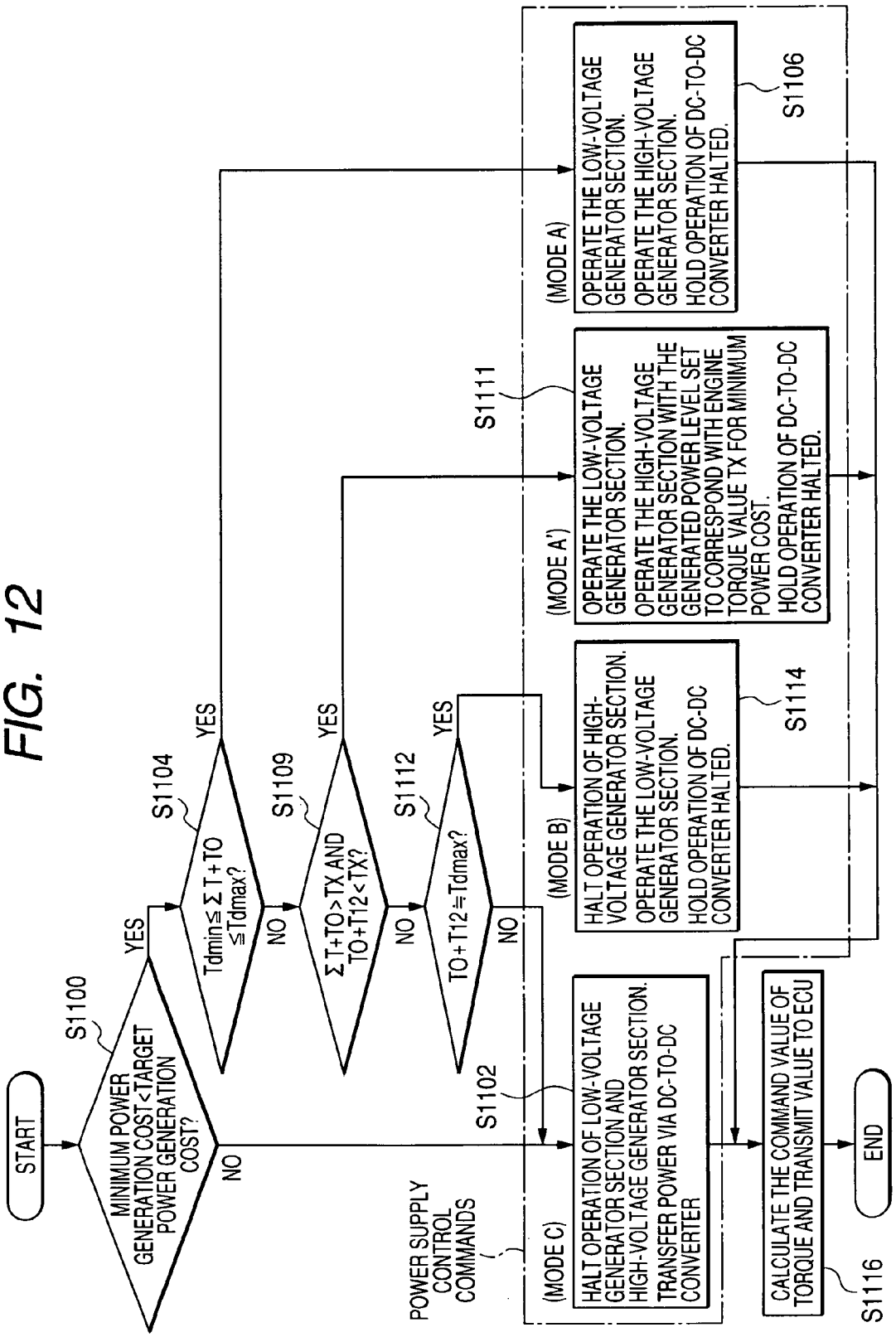
FIG. 12 is a flow diagram corresponding to FIG. 5, for describing the operation of a modified embodiment.

A modified embodiment will be described in the following. FIG. 12 is a flow diagram of the contents of step S110 of FIG. 2, for this modified embodiment. As shown, the control processing differs from that of the first embodiment described above with respect to the judgement made in step S1108 and the processing of step S1110 in FIG. 5 for the first embodiment, with these steps being respectively replaced by the steps S1109 and S1111 in FIG. 12. In other respects, the operation is identical to that of the above embodiment.

In this case, instead of the judgement of step S1108 described above, a decision is made in step S1109 as to whether:

(a) the sum of the zero-power torque value T0 and the total available power generation torque ΣT is greater than a minimum-cost engine torque TX, which corresponds to the minimum electric power generation cost X (shown in FIG. 4) while also (b) the sum of T0 and the power generation torque T12 is less than the minimum-cost engine torque TX.

If there is a YES decision, then {(TX−(T0+T12)} is set as the power generation torque T42x of the high-voltage generator section 4b, and the regulator section 11 is commanded to control the high-voltage generator section 4b to generate power at a level corresponding to T42x (step S1111). The condition in which T4X is equal to {(TX−(T0+T12)} is illustrated in the example of FIG. 7. In that way, the total available power generation torque ΣT becomes (T42x+T12) and the total required engine torque is TX, i.e., the engine operates at the minimum electric power generation cost X.

Thus, irrespective of the conditions of the voltage variation-tolerant loads H1~Hm, power is generated by the high-voltage generator section 4b at the minimum cost X.

Figure 10C:
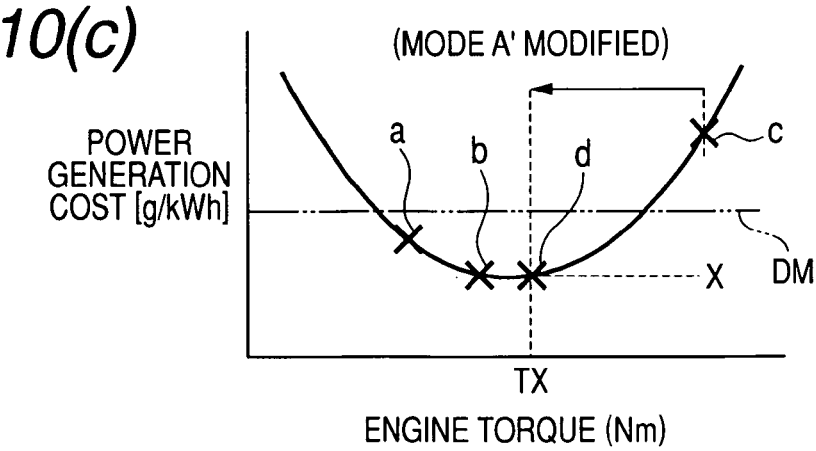
FIG. 10(c) illustrates the case of a modified power supply mode A'.

FIG. 10(c) shows an example of an operating condition in which the power generated by the high-voltage generator section 4b is adjusted so that the total required engine torque is set at the minimum-consumption value TX, with this modified embodiment.

Figure 5:
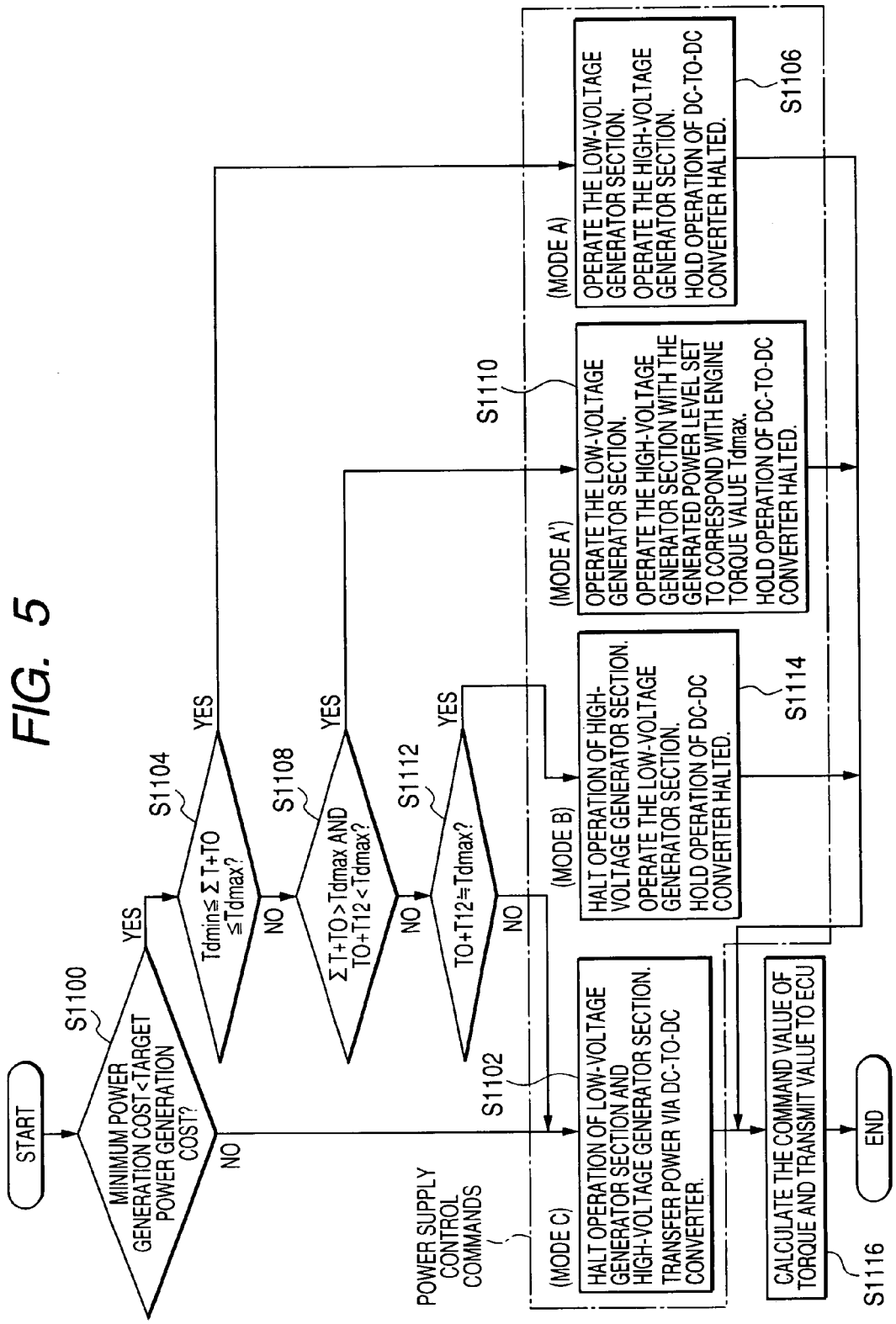
FIG. 5 is a flow diagram for describing power supply control processing that is performed by the embodiment.

It would of course also be possible to further modify this embodiment, to execute the processing of FIG. 1108 in FIG. 5 if there is a NO decision in step S1109 of FIG. 12.

As can be understood from the above description, the invention enables power cost reduction generation control to be applied whereby reduced fuel costs can be achieved, without the need to utilize a large-capacity electric charge storage device as the high-voltage battery 2. This is due to the fact that electrical power generation is performed by assigning priority to achieving minimized generation cost, rather than giving priority to supplying specific levels of power to all of the electrical loads.

Alternative Configuration

In addition to applying electrical power transfer control using the DC-to-DC converter 3 as described above, to enable the level of power generated by the dual-voltage electric generator 4 to be flexibly controlled to achieve minimized electrical power cost, it would be possible to establish a priority order for the voltage variation-tolerant loads H1~Hm. In that case, the respective levels of power supplied to these loads would be adjusted in accordance with their positions in the priority order, with the adjustment performed based on the target power generation cost DM or upon the state of charge of the high-voltage battery 2. When there is only a limited the level of power available for the voltage variation-tolerant loads H1~Hm, the power supplied to one or more of these loads would be selectively interrupted or reduced in accordance with the order of priority of the loads, rather than simply reducing the total level of power supplied to the loads.

It will be understood that various other modified embodiments or alternative configurations could be envisaged, in accordance with the principles described above, that fall within the scope claimed for the invention.

What is claimed is:

1. A vehicle-use power supply apparatus comprising an electric generator apparatus driven by a vehicle engine to generate electrical power, an electrical energy storage apparatus, and a control apparatus coupled to said electric generator apparatus for controlling said generated electrical power and for controlling supplying of said generated electrical power to said electrical energy storage apparatus and to a plurality of electrical loads, with said control apparatus comprising circuitry adapted to implement power cost reduction generation control by
    applying predetermined criteria to judge a generation cost of producing said generated electrical power,
    when said generation cost is judged to be economical and said generated electrical power is in excess of a level of electrical power required by said electrical loads, supplying said excess electrical power to said electrical energy storage apparatus to be stored therein, and
    when said generation cost is judged to be uneconomical, controlling said electric generator apparatus to produce a lower level of electrical power than required by said electrical loads and effecting discharging of said electrical energy storage apparatus to supply electrical power to said electrical loads;
wherein said power supply apparatus comprises:
    a regulated voltage power supply system for supplying electrical power to a voltage-regulated electrical load, with said regulated voltage power supply system comprising a first electrical energy storage device for supplying electrical power to said voltage-regulated electrical load and a first electric generator driven by said vehicle engine for supplying electrical power to said first electrical energy storage device and to said voltage-regulated electrical load; and
    a voltage variation-tolerant power supply system comprising a second electrical energy storage device for supplying electrical power to a voltage variation-tolerant electrical load, and a second electric generator driven by said vehicle engine for supplying electrical power to said second electrical energy storage device and to said voltage variation-tolerant electrical load; and
said second electrical generator is configured to generate electrical power at a substantially higher voltage than electrical power that is generated by said first electrical generator,
said circuitry of the control apparatus is adapted to control said power supply voltage of said regulated voltage power supply system to a fixed value and to apply said power cost reduction generation control to said voltage variation-tolerant power supply system,
said generation cost is calculated as an amount of fuel consumed in generating a unit amount of electrical energy,
said electrical power generated by said second electric generator is increased when it is judged that said generation cost has fallen below a predetermined threshold value and is reduced when it is judged that said generation cost has risen above said predetermined threshold value, and
said circuitry of the control apparatus comprises a memory having a first data map held stored therein, with said first data map relating respective values of said generation cost to corresponding amounts of a total required engine torque that is required to be applied by said engine to said first electric generator and said second electric generator in combination, and wherein circuitry of the control apparatus is adapted to
    establish a target generation cost as a target value of said generation cost,
    apply said target generation cost to said first data map for thereby obtaining a range of permissible torque as a range of values of said total required engine torque corresponding to generation cost values that are below said target generation cost, and
    control said second electric generator to produce a level of electrical power whereby said total required engine torque is within said range of permissible torque.

2. A vehicle-use power supply apparatus according to claim 1, wherein said circuitry of the control apparatus is adapted to derive data indicative of a level of charge remaining in said second electric charge storage device and to calculate said target value based upon said level of charge.

3. A vehicle-use power supply apparatus according to claim 2, wherein
said circuitry of the control comprises a memory having a second data map stored therein which relates limit values of said target generation cost to corresponding values of said level of charge, with said limit values of target generation cost successively increasing in accordance with decrease of said level of charge, and
said control apparatus is adapted to
    derive a current level of charge of said second electric charge storage device,
    apply said derived level of charge to said data map for thereby obtaining a corresponding limit value of target generation cost, and
    set said corresponding limit value as said target generation cost.

4. A vehicle-use power supply apparatus according to claim 1, wherein said circuitry of the control apparatus is adapted to
    calculate a cost per unit amount of electrical energy currently held stored in said second electric charge storage device as an average of respective generation costs of unit amounts of electrical energy successively stored in said second electric charge storage device, and
    set said calculated cost as said target generation cost.

5. A vehicle-use power supply apparatus according to claim 1, wherein said circuitry of the control apparatus comprises a memory having a second data map stored therein which relates limit values of said target generation cost to corresponding values of a level of charge of said second electric charge storage device, with said limit values of target generation cost successively increasing in accordance with decrease of said level of charge, and wherein said circuitry is adapted to
    derive data indicative of said level of charge, and obtain a corresponding limit value of target generation cost from said data map,
    calculate a stored energy cost as a cost per unit amount of electrical energy currently held stored in said second electric charge storage device, by calculating an average value of respective generation costs of unit amounts of electrical energy successively stored in said second electric charge storage device, and
    select a higher one of said stored energy cost and said corresponding limit value of target generation cost, as said target generation cost.

6. A vehicle-use power supply apparatus according to claim 2, wherein said circuitry of the control apparatus is adapted to compare said target generation cost with said generation cost, and
when said generation cost is judged to have fallen below said target generation cost, apply control to increase said electrical power produced by said second electric generator,
when said generation cost is judged to have increased beyond said target generation cost, apply control to decrease said electrical power produced by said second electric generator.

7. A vehicle-use power supply apparatus according to claim 2, wherein said circuitry of the control apparatus is adapted to control said electrical power produced by said second electric generator to a value whereby said total required engine torque corresponds to a minimum value of said generation cost.

8. A vehicle-use power supply apparatus according to claim 2, wherein said circuitry of the control apparatus is adapted to
judge when a difference between said target value and said generation cost exceeds a predetermined amount, and,
when said predetermined amount is judged to be exceeded, apply control for increasing a level of charge/discharge power of said second electric charge storage device to a higher value than when said difference is smaller than said predetermined amount.

9. A vehicle-use power supply apparatus according to claim 1, wherein said circuitry of the control apparatus comprises a memory having stored therein a second data map, which relates values of rotation speed at which said first and second electric generators are driven to corresponding values of available power generation torque, where each of said values of available power generation torque is an amount of torque absorbed by said second electric generator in producing a substantially maximum level of generated electrical power at a specific rotation speed, and
wherein said circuitry of the control apparatus is adapted to
calculate a value of zero-power drive torque as an amount of drive torque that is absorbed by said first electric generator and second electric generator in combination when being driven with no electrical power generated by either of said first electric generator and second electric generator,
calculate a value of generated electrical power of said first electric generator based upon detected values of output voltage and output current of said first electric generator, and calculate a corresponding value of power generation torque that is absorbed by said first electric generator in producing said calculated value of generated electrical power,
apply a current value of said rotation speed to said second data map to obtain a corresponding value of said available power generation torque,
calculate a first total drive torque as the sum of said zero-power drive torque and said power generation torque of said first electric generator,
calculate a second total drive torque as the sum of said zero-power drive torque, said power generation torque of said first electric generator, and said available power generation torque of said second electric generator,
compare each of said first total drive torque and second total drive with said permissible torque range, and control said first electric generator and second electric generator based on a result of said comparison.

10. A vehicle-use power supply apparatus according to claim 9, wherein:
when said second total drive torque is judged to be within said permissible torque range, said control apparatus enables operation of each of said first electric generator and said second electric generator, with said second electric generator controlled to produce a level of electrical power that corresponds to said available power generation torque;
when said second total drive torque is judged to be greater than said maximum value of the permissible torque range while said first total drive torque is less than said maximum value, said control apparatus enables operation of each of said first electric generator and said second electric generator, and controls said second electric generator to produce a level of electrical power whereby said total required engine torque attains said maximum value of the range of permissible torque; and,
when said second total drive torque is judged to be greater than said maximum value of the permissible torque range while said first total drive torque is substantially equal to said maximum value, said control apparatus enables operation of said first electric generator and halts operation of said second electric generator.

11. A vehicle-use power supply apparatus according to claim 9, comprising a power transfer apparatus controllable by said control apparatus for transferring electrical power between said regulated power supply system and said voltage variation-tolerant power supply system, wherein
when said first total drive torque and said second total drive torque correspond to respective values of power generation cost that are each higher than said target value of electrical power cost, said control apparatus halts operation of each of said first electric generator and said second electric generator, and controls said power transfer apparatus to transfer electrical power discharged from said second electric charge storage device into said regulated voltage power supply system, with said transferred electrical power being set at a level for maintaining said power supply voltage of the regulated voltage power supply system at said fixed value.

12. A vehicle-use power supply apparatus according to claim 9, wherein:
when said second total drive torque is judged to be greater than a minimum-cost torque, where said minimum-cost torque is a value of said total required engine torque which corresponds to a minimum value of said generation cost, while said first total drive torque is judged to be less than said minimum-cost torque, said control apparatus enables operation of each of said first electric generator and said second electric generator, and controls said second electric generator to produce a level of electrical power whereby said total required engine torque attains said minimum-cost torque.

13. A vehicle-use power supply apparatus according to claim 1, wherein said first electric charge storage device is a lead-acid battery.

14. A vehicle-use power supply apparatus according to claim 1, wherein said second electric charge storage device is a lithium-ion secondary battery.

15. A vehicle-use power supply apparatus according to claim 1, wherein said second electric charge storage device is a capacitor.

* * * * *